US008477096B2

(12) United States Patent
Nagiyama et al.

(10) Patent No.: US 8,477,096 B2
(45) Date of Patent: *Jul. 2, 2013

(54) DISPLAY APPARATUS AND METHOD OF CONTROLLING SAME

(75) Inventors: Kei Nagiyama, Nagoya (JP); Hidehiko Kawakami, Nagoya (JP); Motohiro Fukumoto, Nagoya (JP); Keisuke Uto, Tokyo (JP)

(73) Assignee: Denso Corporation, Kariya (JP)

( * ) Notice: Subject to any disclaimer, the term of this patent is extended or adjusted under 35 U.S.C. 154(b) by 108 days.

This patent is subject to a terminal disclaimer.

(21) Appl. No.: 13/099,405

(22) Filed: May 3, 2011

(65) Prior Publication Data

US 2011/0214087 A1   Sep. 1, 2011

Related U.S. Application Data

(62) Division of application No. 11/715,501, filed on Mar. 8, 2007, now Pat. No. 7,969,412.

(30) Foreign Application Priority Data

Mar. 24, 2006   (JP) ................................. 2006-083695
Dec. 28, 2006   (JP) ................................. 2006-355175

(51) Int. Cl.
*G09G 5/00*   (2006.01)
*G09G 5/08*   (2006.01)
*G06F 3/033*   (2006.01)
*G06F 3/041*   (2006.01)

(52) U.S. Cl.
USPC ............ 345/156; 345/161; 345/163; 345/173

(58) Field of Classification Search
USPC .................................................. 345/156–184
See application file for complete search history.

(56) References Cited

U.S. PATENT DOCUMENTS 6,388,684 B1   5/2002   Iwamura et al.
6,747,680 B1   6/2004   Igarashi et al.
(Continued)

FOREIGN PATENT DOCUMENTS

JP   A-H7-280577   10/1995
JP   A-H10-161628   6/1998
(Continued)

OTHER PUBLICATIONS

Office Action dated Sep. 26, 2012 in a corresponding German Application No. 10 2007 013 320.2 (and English translation).

(Continued)

*Primary Examiner* — Srilakshmi K Kumar
(74) *Attorney, Agent, or Firm* — Posz Law Group, PLC

(57) ABSTRACT

A screen display apparatus includes an operation information reception unit that receives operation information regarding an inclination direction and an inclination angle of a joystick from the joystick, and a screen controller that performs a scroll process for scrolling a screen and a zoom process for zooming based on the operation information. The screen controller scrolls the screen according to the inclination direction and the inclination angle of the joystick, and continues a zoom-out process for zooming-out of the screen based on a detection of the inclination angle that is greater than a predetermined angle for a predetermined period until detecting the inclination angle of the joystick to be equal to or smaller than the predetermined angle or until zooming out to a predetermined minimum zoom rate.

6 Claims, 14 Drawing Sheets

U.S. PATENT DOCUMENTS

| | | | |
|---|---|---|---|
| 7,969,412 B2* | 6/2011 | Nagiyama et al. | 345/156 |
| 2004/0113952 A1 | 6/2004 | Randall | |
| 2006/0174213 A1 | 8/2006 | Kato | |
| 2008/0235616 A1 | 9/2008 | Neervoort | |

FOREIGN PATENT DOCUMENTS

| | | |
|---|---|---|
| JP | A-2002-81942 | 3/2002 |
| JP | A-2002-116040 | 4/2002 |
| JP | A-2004-271613 | 9/2004 |
| JP | A-2005-292621 | 10/2005 |

OTHER PUBLICATIONS

Office Action mailed Jan. 24, 2012 in corresponding JP Application No. 2006-355175 (and English translation).

Igarashi et al., *Speed-dependent Automatic Zooming for Efficient Document Navigation*, Japan Society for Software Science and Technology, WISS2000, pp. 56-66, Dec. 2000.

Office Action dated Jun. 2, 2008 issued from the German Patent Office in corresponding German Patent Application No. 102007013320.2 (with English translation).

Office Action dated Jun. 5, 2009 issued from the Chinese Patent Office in corresponding Chinese Patent Application No. 200710089382X (with English translation).

German Office Action dated Nov. 25, 2009 issued from the German Patent Office in corresponding German Patent Application No. 102007013320.2-53 (with English translation).

Office Action issued on May 23, 2011 issued from the Chinese Patent Office in the corresponding Chinese patent application No. 200710089382.X (English translation enclosed).

Office Action mailed Jan. 29, 2013 in corresponding JP Application No. 2012-68301, which is a divisional application of JP-2006-355175 (and English translation).

* cited by examiner

DISPLAY APPARATUS AND METHOD OF CONTROLLING SAME

CROSS REFERENCE TO RELATED APPLICATIONS

The present application is a continuation of U.S. application Ser. No. 11/715,501 filed on Mar. 8, 2007, which is based on and incorporates herein by Japanese Patent Applications No. 2006-83695 filed on Mar. 24, 2006 and No. 2006-355175 filed on Dec. 28, 2006, the disclosures of which are incorporated herein by reference.

FIELD OF THE INVENTION

The present invention generally relates to a screen display apparatus that displays information on a screen of a computer or the like, and more practically, an apparatus that displays a large volume image such as a map or the like.

BACKGROUND OF THE INVENTION

In recent years, a technique of scrolling is known as a way for displaying a large volume of information that can not fit into a screen. The scrolling technique moves a content of the screen in an upward/downward/leftward/rightward direction for displaying a portion of information that spilled over from the screen. However, scrolling through a large volume of information requires time and effort due to the amount of the information to be scrolled. In addition, the content of information cannot be grasped during scrolling when scrolling speed is increased.

A scale of the image displayed on the screen is changed by zooming in and zooming out. That is, the image "zooms in" when the scale (i.e., a shrinking factor) of the image is decreased, and the image "zooms out" when the scale of the image is increased. The spilled-over content can be included in the screen when the image is zoomed out.

A large portion of conventional screen display apparatuses are configured to have different interfaces respectively for scrolling and zooming control. Therefore, the scrolling operation and the zooming operation had to be frequently changed for finding a desired portion of a large volume image. The frequent change of the scrolling operation and the zooming operation caused hassles to a user of the screen display apparatus. For example, the image in the screen had to be zoomed out for roughly locating desired information in the zoomed-out image at first, and then the image had to be zoomed in for closely searching the desired information.

A non-patent document 1 discloses a technique that resolves the hassles of the above operation by combining the scrolling and the zooming. This document discloses an interface that automatically controls a zoom level based on a speed of the scroll operation. This document proposes a basic concept of a constant scroll speed on the screen regardless of an actual speed in the information space. In this manner, the scrolling speed that is too fast to be caught by the eye is prevented. Further, this non-patent document proposes a plan that prevents an abrupt zooming out in a high-speed scroll by calculating the zoom level based on a power of an input value.

[Non-patent document 1] "Effective navigation by an automatic zooming according to a movement speed"by Takeo Igarashi, Ken Hinckley in a proceeding for 8th workshop of interactive systems and software (WISS2000), pp. 57-66, December 2000.

However, the technique in the above-identified non-patent document 1 is that the speed of the scrolling on the screen (i.e., a visual speed of screen) is kept at a constant rate, thereby being unable to scroll through the information space over the scroll speed inputted from an input device. For example, even when the input value of the scroll speed doubles, the scrolling speed is visually kept constant on the screen where the zoom level is changed to ½. In other words, the information space is not scrolled through as twice as fast by this technique. Therefore, it takes a long time to find the desired information in the large volume of information such as a map or the like.

Further, when a relationship between the input value from the input device and the scroll speed are set so as to access the information far apart in the information space in an appropriate period, the zoom level becomes susceptible to a small change in the input value to cause a large scale change due to the gap of a range of the input value and the scale of the information space as well as the restriction on the input range of the input device. Particularly, when the information such as a map or the like is equally beneficial at any level between the zoomed-in image and the zoomed-out image, a frequent change of the zoom rate causes problems for practical use.

SUMMARY OF THE INVENTION

In view of the situation described above, the object of the present invention is to provide a screen display apparatus having an easily searchable interface that handles a large volume of information.

The screen display apparatus of the present invention includes an operation information reception unit that receives operation information regarding a scroll direction and a scroll speed of a screen from an input device, and a screen controller that performs a scroll process for scrolling a content of_a screen based on the operation information received by the operation information reception unit and performs a zoom process for changing a zoom rate of the screen based on a scroll time and a scroll speed of scrolling in a same scroll direction.

In this manner, scroll time information derived from the operation information that represents the scroll direction and the scroll speed is utilized for changing a zoom rate, thereby enabling an automatic zoom rate change by a scroll operation. In addition, since the zoom rate is not controlled to be proportional but associated with the scroll speed and a scroll time of the scroll in the same direction, the zoom rate control is prevented from suffering from a frequent change due to the change of the scroll speed.

A method for displaying a screen of the present invention includes a step for receiving operation information regarding the scroll direction and the scroll speed from the input device, and a step for performing the zoom process for changing the zoom rate based on the scroll time and the scroll speed in the same direction with performing the scroll process for scrolling a content of a screen based on the operation information received by a step for receiving the operation information.

By devising the above method, the zoom rate is automatically changed in the course of the scroll operation, and the zoom rate control is prevented from suffering from a frequent change due to the change of the scroll speed. Further, various features of the screen display apparatus of the present invention can be applied to the method for displaying the screen of the present invention.

In the present invention, a program stored in a memory medium for operating a computer as a screen display apparatus includes steps of receiving operation information regarding the scroll direction and the scroll speed from the input device, and performing the zoom process for changing the zoom rate based on the scroll time and the scroll speed in the same direction with performing the scroll process for scrolling a content of a screen based on the operation information received by a step of receiving the operation information.

By devising the above program, the zoom rate is automatically changed in the course of the scroll operation, and the zoom rate control is prevented from suffering from a frequent change due to the change of the scroll speed. Further, various features of the screen display apparatus of the present invention can be applied to the program for displaying the screen of the present invention.

In another aspect of the present invention, the screen display apparatus includes a touch panel that senses a touch position of a finger in the screen, and a screen controller that performs a scroll process for scrolling the content of the screen based on the touch position and performs the zoom process for zooming out control of the content of the screen in the course of scrolling when a continuous touch of the finger for a predetermined period is detected.

When the finger is touching the touch panel continuously for the predetermined period as described above, the zoom process for zooming out and the scroll process are performed to quickly scroll through the information space based on the assumption that the user has an intention that he/she desires to get information far apart from a current position.

In yet another aspect of the present invention, the screen display apparatus includes a touch panel that senses a touch position of a finger in a screen, a screen controller that operates in a first mode and in a second mode, and a switch unit that switches the first mode and the second mode. In this case, the first mode of the screen controller performs a scroll process for scrolling a content of the screen based on the touch position and performs a zoom process for zooming out control of the content of the screen in a course of scrolling when a continuous touch of the finger for a predetermined period is detected, and the second mode of the screen controller performs only the scroll process for scrolling the content of the screen regardless of the period of the touch of the finger.

When the first mode for simultaneous zoom out with scroll process and the second mode for scroll only process are selectively provided, an appropriate scroll process is performed based on the intention of the user. Also, the continuous touch of the user finger on the touch panel enables the user to scroll through the information space quickly by combining the zoom out process with the scroll process according to the intention of the user.

In yet another aspect of the present invention, the screen display apparatus includes a coordinate input unit that detects the touch position of one of the finger and the pointing device by using a flat detection device, a screen controller that performs a scroll process for scrolling a content of the screen based on the touch position and performs the zoom process for zooming out control of the content of the screen in the course of scrolling when the continuous touch of the finger for a predetermined period is detected and a switch unit that switches an operation mode between the first mode and the second mode.

When the finger is touching the coordinate input unit continuously for the predetermined time, the zoom process for zooming out and the scroll process are performed to quickly scroll through the information space based on the assumption that the user has an intention that he/she desires to get information far apart from a current position.

In still yet another aspect of the present invention, the screen display apparatus includes a joystick that senses an inclination direction and an inclination angle of itself, and a screen controller that performs a scroll process for scrolling a content of a screen based on the inclination direction and the inclination angle of the joystick and performs a zoom process for changing a zoom rate of the content of the screen based on a scroll time and a scroll speed of scrolling in a same scroll direction.

In this manner, the scrolling controlled by the joystick is also enabled to have the automatic zoom rate change capability according to the scroll direction and the scroll speed. In this case, the screen controller may determine the scroll direction according to the inclination direction of the joystick, and may determine the scroll speed according to the inclination angle of the joystick.

In still yet another aspect of the present invention, the screen display apparatus includes a rotary input device that senses a rotation direction and a rotation speed, and a screen controller that performs the scroll process for scrolling the content of the screen based on the rotation direction and the rotation speed and performs the zoom process for changing the zoom rate of the content of the screen based on the scroll time and the scroll speed of scrolling in the same scroll direction.

In this manner, the scrolling controlled by the rotary input device is also enabled to have the automatic zoom rate change capability according to the scroll direction and the scroll speed. In this case, the rotary input device may be, for example, a trackball, a jog dial, a rotary knob (e.g., a device such as a volume control knob of an audio apparatus).

The screen controller may determine the scroll direction according to the inclination direction of the joystick, and may determine the scroll speed according to the inclination angle of the joystick.

In still yet another aspect of the present invention, a program stored in a memory medium for operating a computer as a screen display apparatus comprising steps of receiving position information regarding a touch position of a finger from a touch panel, and a step of performing a zoom process for a zooming-out with scrolling control of a content of a screen based on a detection of a continuous finger contact for a predetermined period simultaneously with performing a scroll process for scrolling the content of the screen based on the touch position of the finger.

By executing this program, the continuous touch of the finger on the touch panel is associated with the zoom out with scroll process, thereby enabling the user to quickly scroll through the information space based on the intention of the user.

The present invention provides an outstanding advantage that the zoom rate is automatically changed in association with the scroll operation, and the zoom rate is controlled with ease based on the prohibition of the frequent zoom rate change due to the change in the scroll speed.

DETAILED DESCRIPTION

Figure 1:
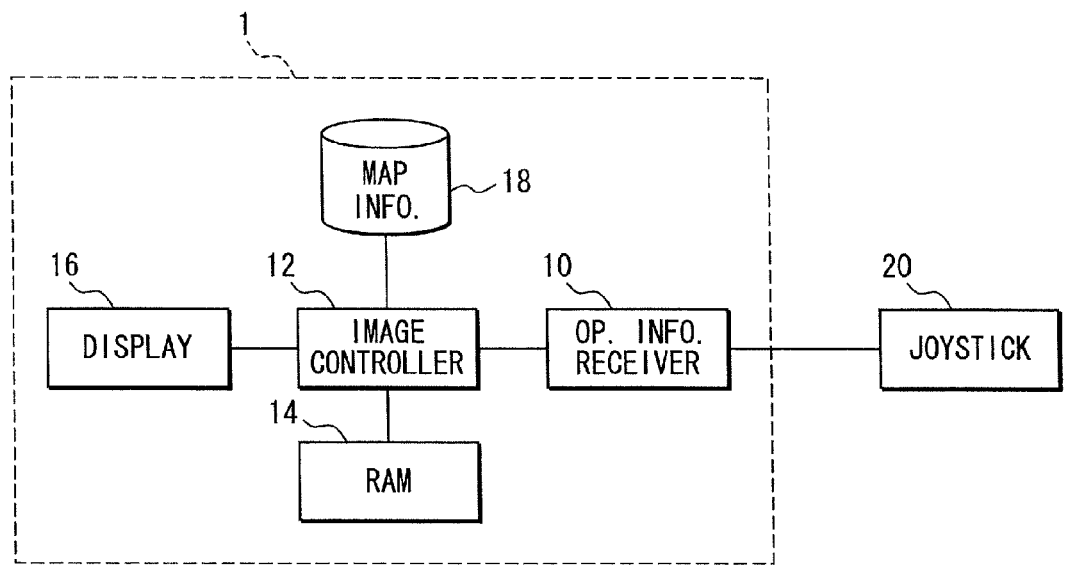
FIG. 1 shows a block diagram of a screen display apparatus according to a first embodiment of the present invention.

Embodiments of a screen display apparatus of the present invention is described with reference to the drawing. In the following, the screen display apparatus is described as a map image display apparatus. However, application of the present invention is not limited to the map image display apparatus.

(First Embodiment)

FIG. 1 is a block diagram showing a constitution of a screen display device 1 in a first enforcement. The screen display device 1 includes an operation information receiver 10 for receiving an operation information from a joystick 20, an image controller 12 for controlling a content of a screen based on the operation information received by the operation information receiver 10, a RAM 14 for storing the operation information received by the operation information receiver 10, and a display 16 for displaying the content of the screen under control of the image controller 12.

Figure 2:
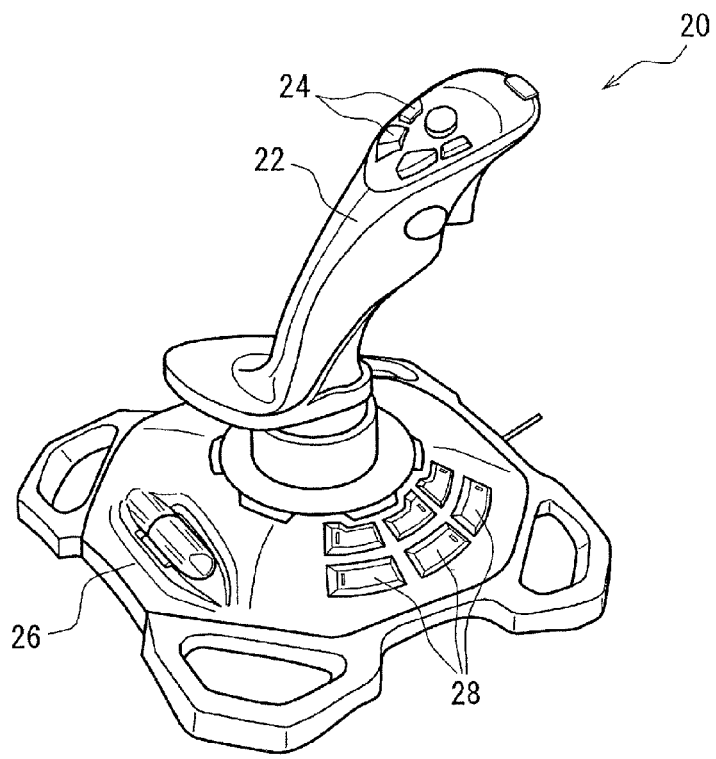
FIG. 2 shows an illustration of a joystick.

FIG. 2 is an illustration showing an appearance of the joystick 20. The joystick 20 includes a lever 22 which can be inclined in either direction on a stand part 26. The joystick 20 transmits a signal that represents an inclination direction and an inclination angle of the lever 22, i.e., the operation information, to the screen display device 1. Plural switches 24 are disposed at an upper part of the lever 22 of the joystick 20. In addition, plural switches 28 are disposed on the stand part 26 that supports the lever 22. The joystick 20 may transmit a signal to the screen display device 1 showing that the switch 24, 28 or the like are pushed.

The image controller 12 of the screen display device 1 has a function for controlling a scroll of the content of the screen based on the inclination direction and the inclination angle of the joystick 20 received by the information receiver 10. More practically, the image controller 12 displays map information on the screen in a successively changing manner so that the image on the screen appears to be scrolling or zooming after retrieving the map information from map information storage 18.

The image controller 12 controls the scroll of the content of the screen in the inclination direction of the joystick 20 at a speed that accords with the inclination angle based on the operation information received from the joystick 20.

Further, the image controller 12 controls the zoom rate based on the inputted operation information as well as the past operation information stored in the RAM 14. Concretely, when the joystick 20 is detected to be inclining in the same direction continuously for a prescribed time to an extent that is greater than a threshold D1, the image controller 12 performs a zoom out process. At the time of zooming out, the image controller 12 performs the zoom out process at a constant speed so that the zooming out looks smooth. In this case, an upper boundary of the zooming out is set in advance, and the zoom out process stops when the zoom rate reaches the upper boundary.

Furthermore, at a zoomed out condition, when the joystick 20 is detected to be inclined in the same direction continuously for a prescribed time to an extent that is equal to or smaller than a threshold D2 that is smaller than the threshold D1, the image controller 12 performs a zoom in process. At the time of zooming in, the image controller 12 performs the zoom in process at a constant speed so that the zooming in looks smooth. In this case, a lower boundary of zooming in is set in advance in the present embodiment, and the zoom in process stops when the zoom rate reaches the lower boundary. In the present embodiment, the lower boundary of the zoom rate is the zoom rate that is used to display the content of the screen for the first time with the zoom rate displayed therein (i.e., a "default" content of the screen). Therefore, the image controller 12 does not perform the zoom in process if the content of the screen is not in a zoomed out condition from the default.

Figure 3:
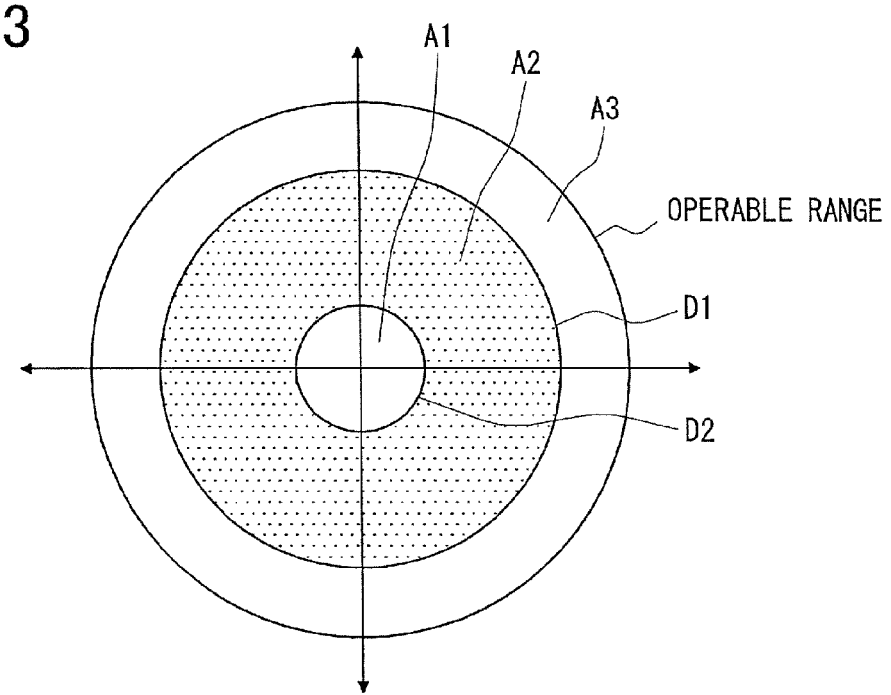
FIG. 3 shows an illustration that depicts a relationship of a joystick lever movable range and a threshold for zooming operation.

FIG. 3 is an illustration of a relationship between an operable range of the lever 22 of the joystick 20 and the thresholds D1, D2. A vertical axis of a diagram in FIG. 3 and a horizontal axis of the same respectively show the inclination angle of the lever 22 in a longitudinal direction and a lateral direction. When the inclination angle of the joystick 20 is greater than the threshold D1, the zoom out process is performed. That is, when the lever 22 of the joystick 20 is inclined within an area A3 in the diagram of FIG. 3, the zoom out process is performed. When a degree of the inclination angle of the joystick 20 is equal to or smaller than the threshold D2, the zoom in process is performed. That is, when the lever 22 of the joystick 20 is inclined within an area A1 in the diagram of FIG. 3, the zoom in process is performed. Further, a degree of the inclination angle of the joystick 20 is within an area A2, the inclination angle is neutral for a change of the zoom rate. That is, the image controller 12 does not perform a process to change the zoom rate. In this manner, the image controller 12 performs the zoom out process when the joystick 20 is largely inclined in a certain direction, and the image controller 12 performs the zoom in process when the inclination angle of the joystick 20 decreases to a certain range. Therefore, the content of the screen is controlled according to the intention of the user.

Figure 4:
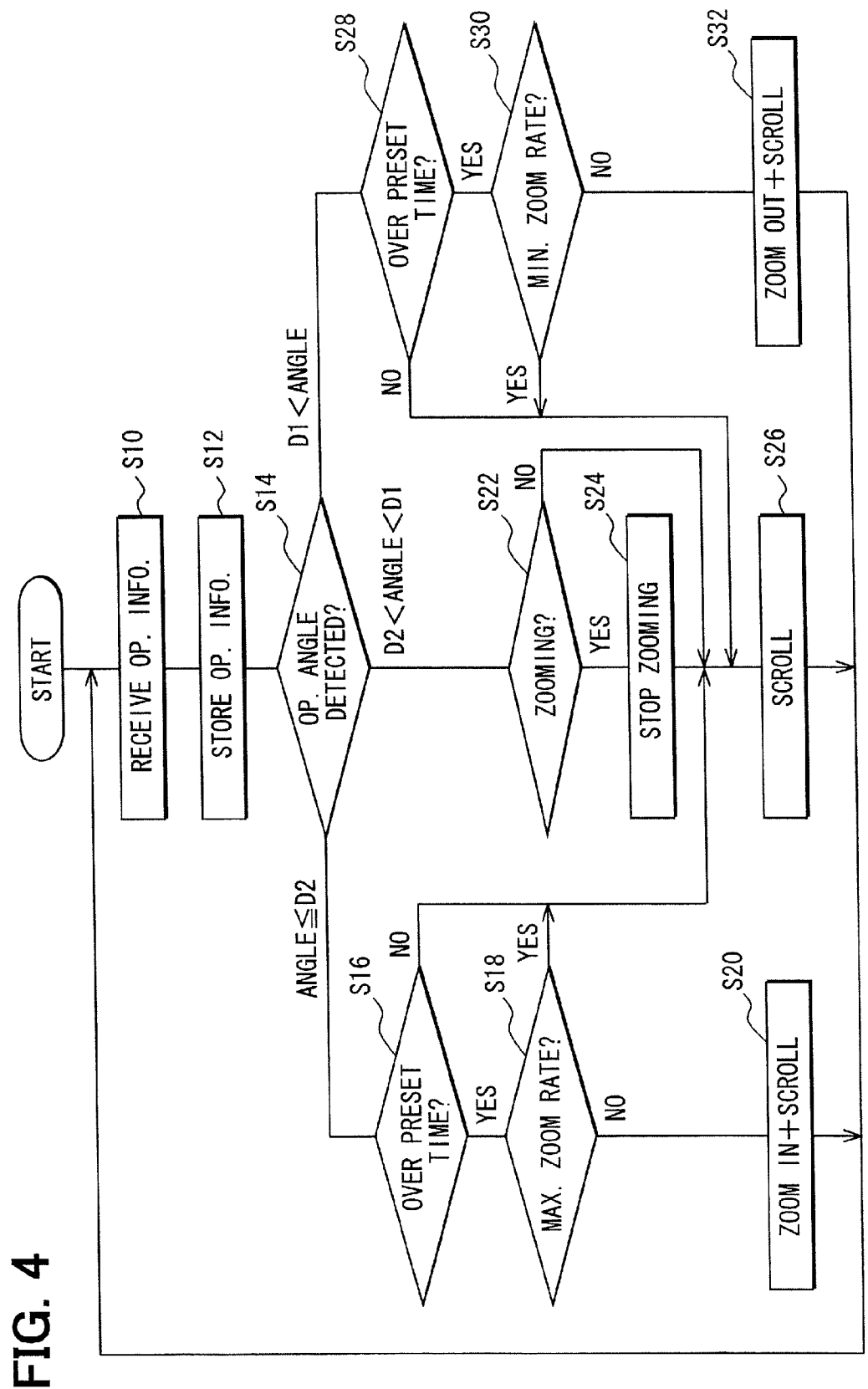
FIG. 4 shows a flowchart of an operation process of the screen display apparatus in the first embodiment.

FIG. 4 shows a flowchart of an operation process of the screen display device 1 in the present embodiment. The screen display device 1 receives the operation information transmitted from the joystick 20 one by one and performs a screen display control based on the operation information. In the following, the operation process of the screen display device 1 is described.

The screen display device 1 in the present embodiment receives the operation information that represents the inclination direction of the lever 22 and the degree of the inclination angle from the joystick 20 (S10). The screen display device 1 inputs the operation information received by the operation information receiver 10 to the image controller 12, and the image controller 12 stores the inputted operation information in the RAM 14 temporarily (S12).

Image controller 12 determines a degree of the inclination angle of the joystick 20 based on the inputted operation information (S14). Based on a result of the determination of the inclination angle, when the degree of the inclination angle of the joystick 20 is equal to or less than the threshold D2 (included in the area A1 of FIG. 3), the image controller 12 performs the following process. First, the image controller 12 determines whether the angle is equal to or less than the threshold D2 for more than predetermined time (S16).

When the inclination angle equal to or under the threshold D2 is not kept for more than the predetermined time as a result of the determination (S16:NO), the image controller 12 performs the scroll process based on the inputted operation information (S26). When the inclination angle equal to or under the threshold D2 is determined to be kept for more than the predetermined time (S16:YES), the image controller 12 determines whether a current zoom rate is the maximum zoom rate (a default zoom rate) (S18).

When the current zoom rate is the maximum zoom rate as a result of the determination (S18:YES), the image controller 12 performs the scroll process (S26). When the current zoom rate is not the maximum zoom rate (S18:NO), the image controller 12 performs the zoom process with the scroll process based on the inputted operation information for scrolling the content of the screen with zooming in (S20). Then, the screen display device 1 returns to step S10 for receiving the operation information from the joystick 20.

When the degree of the inclination angle of the joystick 20 is greater than the threshold D2 and equal to or less than the threshold D1 (within the area A2 of FIG. 3) as a result of determination of the inclination angle of the joystick 20 (S14), the image controller 12 performs the following process. First, the image controller 12 determines whether the zoom rate is being changed (S22). In other words, the image controller 12 determines whether the zoom in process (S20) or the zoom out process (S32) is being performed.

When the zoom rate is determined to be changing as a result of the determination (S22:YES), the image controller 12 stops the zoom process (S24), and performs the scroll process based on the inputted operation information (S26). When the zoom rate is determined to be not changing (S22:NO) in the determination the zoom rate change condition (S22), the image controller 12 performs the scroll process based on the inputted operation information (S26). Then, the screen display device 1 returns to step S10 for receiving the operation information from the joystick 20.

When the inclination angle is greater than the threshold D1 (i.e., within the area A3 of FIG. 3) as a result of the determination of the inclination angle of the joystick 20 (S14), the image controller 12 performs the following process. First, the image controller 12 determines whether the inclination angle greater than the threshold D1 in the same direction is kept for more than the predetermined time (S28).

When the inclination angle greater than the threshold D1 is determined not to be kept for more than the predetermined time (S28:NO) as a result of the above determination, the image controller 12 performs the scroll process based on the inputted operation information (S26). When the inclination angle greater than the threshold D1 is determined to be kept for more than the predetermined time (S28:YES), the image controller 12 determines whether the current zoom rate is the minimum zoom rate (S30).

When the current zoom rate is determined to be minimum as a result of the above determination (S30:YES), the image controller 12 performs the scroll operation based on input operation information (S26). When the current zoom rate is determined to be not minimum as a result of the above determination (S30:NO), the image controller 12 performs the zoom process with the scroll process based on the inputted operation information for scrolling the content of the screen with zooming out (S32). Then, the screen display device 1 returns to step S10 for receiving the operation information from the joystick 20.

The configuration and operation of the screen display apparatus 1 in the first embodiment is described in the above.

The screen display device 1 in the first embodiment performs the zoom out process when the joystick 20 in inclined in the same direction for the predetermined time over the threshold D1 (S30), and stops the zoom out process when the inclination angle is decreased equal to or below the threshold D1 (S24). In this manner, the content of the screen can be changed to an arbitrary zoom rate, and can also be scrolled at a constant zoom rate that is set at the time of static content display. Therefore, the large volume information can easily be searched only by an operation of the joystick 20 that changes the zoom rate with ease in the course of scrolling. This feature in the present embodiment is especially advantageous when the content of the screen such as the map or the like is desired to be viewed in both of the zoomed in condition and the zoomed out condition.

Further, the device 1 zooms out the content of the screen only when the joystick 20 is inclined in the same direction continuously for the predetermined time (S28). This operation seems to be performed only when the user has the intention that he/she desires to view the information far apart from the current position. That is, when the information is searched around the current position, the zoom rate is not changed against the intention of the user in the present embodiment, thereby enabling the user to search the information with ease.

(Second Embodiment)

Figure 5:
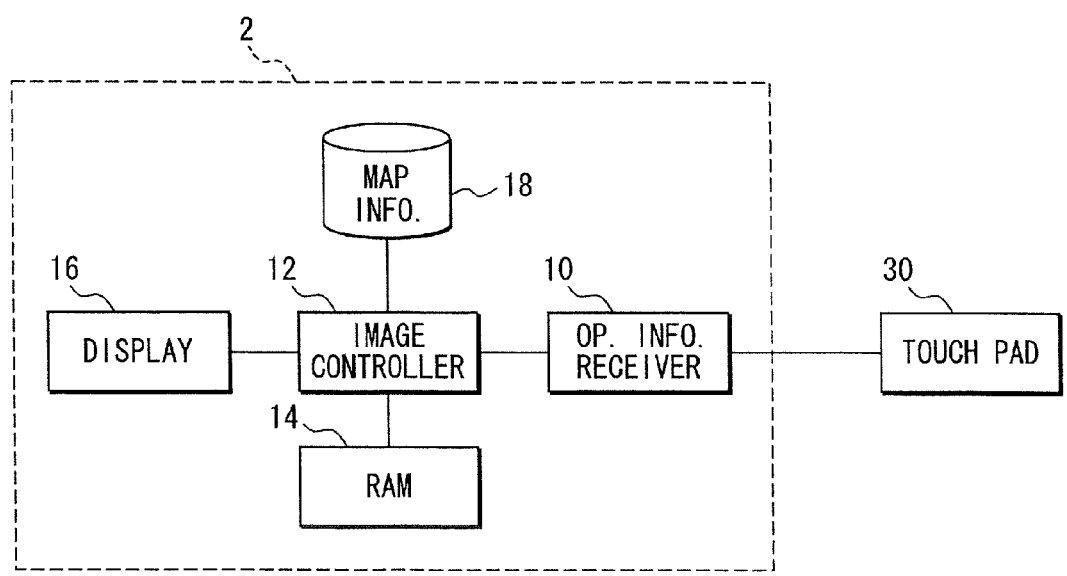
FIG. 5 shows a block diagram of a screen display apparatus in a second embodiment of the present invention.

FIG. 5 shows a block diagram of a screen display apparatus 2 in a second embodiment of the present invention. The apparatus 2 has basically the same structure as the apparatus 1 in the first embodiment. The apparatus 2 includes a touch pad 30 instead of the joystick 20. In the second embodiment, the image controller 12 controls the screen based on the operation information transmitted from the touch pad 30. The operation control by the image controller 12 in the second embodiment is described in the following.

First, before describing the image controller 12, the touch pad 30 is described. The touch pad 30 input information by sensing a trace by a finger on a pad. The present embodiment utilizes the touch pad 30 that is pressure sensitive for sensing a movement of the finger by detecting a pressure on the pad. The touch pad 30 converts the position of the finger detected by the pad to an input value. The touch pad 30 transmits a signal (i.e., operation information) to the apparatus 2.

Now, the image controller 12 in the second embodiment is described. The image controller 12 has a function that scrolls the content of the screen in a traced direction by the speed that accords with a trace speed of the finger for tracing the pad.

Further, the image controller 12 controls the zoom rate based on the inputted operation information as well as the past operation information stored in the RAM14. Concretely, when the touch pad 30 is repeatedly traced in the same direction ("repeated input" in the following), the image controller 12 performs the zoom out process. At the time of zooming out, the image controller 12 performs the zoom out process at a constant speed so that the zooming out looks smooth. In this case, the upper boundary of the zooming out is set in advance, and the zoom out process stops when the zoom rate reaches the upper boundary.

Furthermore, when the repeated input is not detected, the image controller 12 performs the zoom in process. At the time of zooming in, the image controller 12 performs the zoom in process at a constant speed so that the zooming in looks smooth. In this case, the lower boundary of zooming in is set in advance, and the zoom in process stops when the zoom rate reaches the lower boundary (i.e., the default rate). Therefore, the image controller 12 keeps the default zoom rate in the default condition if the repeated input is not detected.

Now, the determination of carrying out the zoom out process based on the repeated input is described. The image controller 12 controls the zoom out process based on a finger departure speed from the touch pad 30 and a cycle of the repeated input when the repeated input is detected. In the present embodiment, a paper plane model is used to calculate the zoom decision value. The decision value is described in detail in the following.

Figure 6:
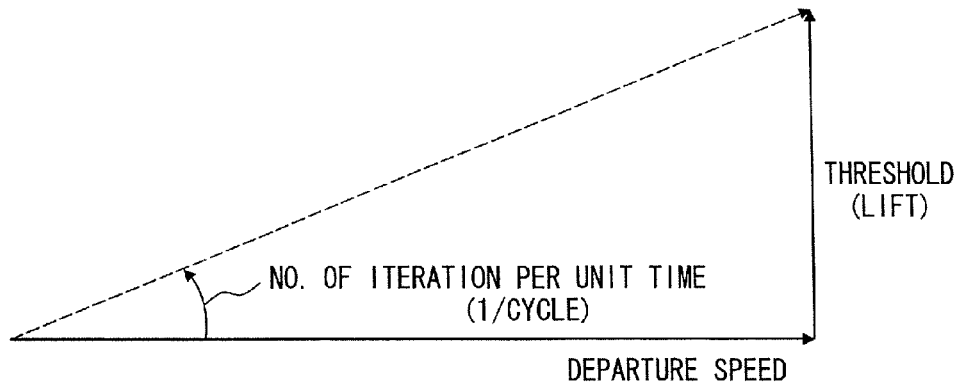
FIG. 6 shows an illustration that depicts a principle for calculating a zoom decision value.

FIG. 6 shows an illustration that depicts a principle for calculating the zoom decision value. The zoom decision value corresponds to a "lift force" in the paper plane model. The image controller 12 calculates a "height" of a triangle with the finger departure speed defined as the base of the triangle and the reciprocal of the cycle of the repeated input (i.e., the number of iteration per unit time) as the rotation angle (i.e., the angle for calculating a tangent). In this case, FIG. 6 shows only a principle, and the actual value of the lift may be calculated appropriately by adding/multiplying a constant. As clearly shown in FIG. 6, the zoom decision value increases when the cycle of the repeated input becomes shorter, or when the finger departure speed becomes faster. When the finger departure speed is zero, or when the input is not repeated, the zoom decision value is zero. The zoom decision value calculated in this manner reflects the intention of the user who desires to view the information far apart from the current position. As an analogy of the paper plane that the lift force surpassing the gravitation force lifts the paper plane, the image controller 12 performs the zoom out process when the zoom decision value (the lift force) surpasses a predetermined threshold (the gravitation force), and performs the zoom in process when the zoom decision value is equal to or smaller than the threshold. The screen display apparatus 2 is configured to have an appropriate value as the predetermined threshold.

Figure 7:
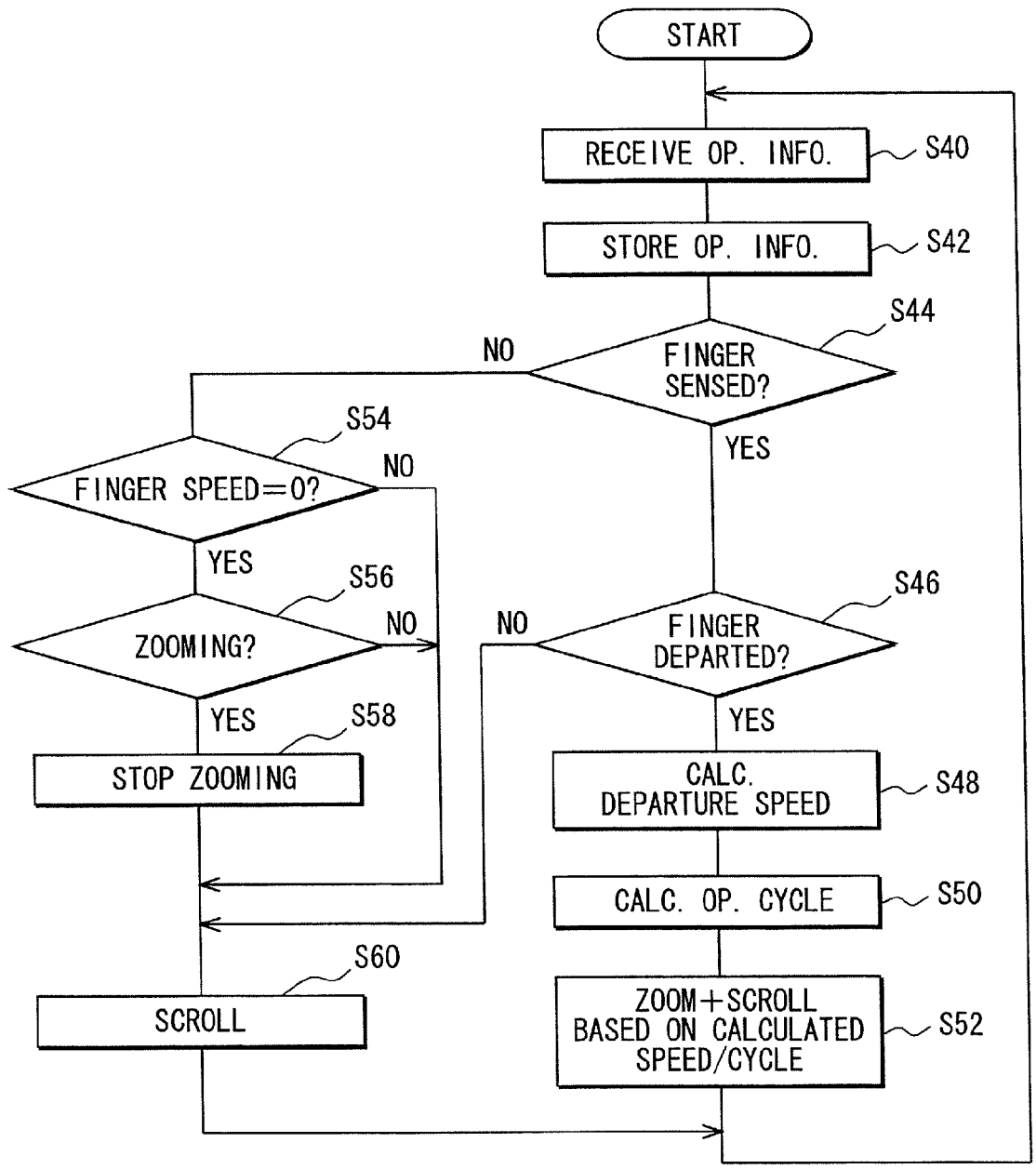
FIG. 7 shows a flowchart of an operation process of the screen display apparatus in the second embodiment.

FIG. 7 shows a flowchart of an operation process of the screen display apparatus 2 in the second embodiment. The screen display apparatus 2 receives the operation information transmitted from the touch panel 30 one by one, and performs the screen display control based on the operation information. The operation of the screen display apparatus after the reception of the operation information is described in the following.

The screen display device 2 receives the operation information that represent a traced direction and speed of the touch pad 30 from the touch pad 30 (S40). Screen display device 2 inputs the operation information received by operation information receiver 10 to image controller 12, and image controller 12 stores the inputted operation information in RAM14 temporarily (S42).

The image controller 12 of the screen display device 2 determines whether the finger touched the touch pad 30 based on the operation information (S44). When a touch of the finger on touch pad 30 is not detected (S44:NO), the finger has already touched the touch pad 30. The image controller 12 determines whether the finger has departed from the touch pad 30 (S46). When the departure of the finger has not been detected in this determination (S46:NO), the finger has been moved in a state of touching the touch pad 30. In this case the image controller 12 scrolls the content of the screen in the traced direction at the speed that accords with the trace speed on touch pad 30 (S60).

When the finger departure from the touch pad 30 is detected (S46:YES) in the determination process (S46), the image controller 12 calculates the finger departure speed (S48). The finger departure speed is a speed of the finger at a small period of time when the finger departs. Next, the image controller 12 calculates the cycle of tracing on the pad 30 based on the operation information stored in RAM14 (S50). When the repeated input is detected based on the operation information stored in RAM14, the image controller 12 calculates the cycle of the inputs as an average of the period between finger departure times and finger landing times. When the repeated input is not detected, the image controller 12 determines that the cycle is equal to "∞" (an infinite: the number of iteration per unit time=0).

The image controller 12 determines the zoom decision value based on the cycle of the traces on the pad 30 and the finger departure speed, and performs the zoom out process when the zoom decision value is greater than the predetermined threshold, or performs the zoom in process when the value is equal to or smaller than the threshold (S52). When the repeated is not detected, the zoom decision value becomes 0 and the image controller 12 performs the zoom in process. However, when the content of the screen is displayed by the default zoom rate, and the zoom rate is kept as it is because further zooming in is not performed. Then, the image controller 12 returns to step S40 for receiving the operation information from the touch pad 30.

When, in the determination of the touch of the finger on the touch pad 30 (S44), the touch of the finger is detected (S44:YES), the image controller 12 determines whether the speed of the finger at the time of landing on the touch pad is equal to zero (S54). The finger landing speed is a speed of the finger at a small period of time when the finger lands on the pad 30. In this case, though the process (S54) determines whether the speed is equal to zero or not, the speed may be determined to be equal to zero by the image controller 12 even when the speed is not accurately equal to zero. The range of the values to be determined as zero may be arbitrarily set according to the sensitivity of the touch pad or the like.

When the finger landing speed is not determined to be equal to zero in this determination (S54:NO), the image controller 12 performs the scroll process in the traced direction at the speed that accords with the trace speed (S60).

The image controller 12 determines whether the zoom process is being performed (S56) when the speed of finger landing is determined to be equal to zero (S54:YES). That is, the image controller 12 determines whether the zoom rate change (S52) is performed. The image controller 12 stops the zoom rate change (S58) and performs the scroll process in the traced direction of the touch pad 30 at the speed that accords with the trace speed (S60) when the zoom rate change is determined to be performed as a result of the determination (S56:YES). When the zoom rate change is determined to be not performed as a result of the determination (S56:NO), the image controller 12 performs the scroll process in the traced direction of the touch pad 30 at the speed that accords with the trace speed (S60). Then, the image controller 12 returns to step S40 for receiving the operation information from the touch pad 30.

The configuration and the operation of the screen display apparatus 2 in the second embodiment of the present invention are described in the above.

The screen display apparatus 2 in the present embodiment performs the zoom out process when the zoom decision value surpasses the predetermined threshold based on the cycle of the repeated input and the finger departure speed, and zooms out until the finger touches the touch pad 30 at the trace speed of zero. Therefore, the content of the screen can be arbitrary zoom rate only by tracing the touch pad 30.

In the screen display apparatus 2 of the present embodiment, the zoom decision value increases as the cycle of the repeated input decreases, and as the finger departure speed increases. Repeated tracing operation in the same direction is performed under the intention to scroll in the traced direction in large. Therefore, the apparatus 2 prevents an unwanted zoom rate change in the search operation for searching the information at the proximity of the current viewing position of the information and makes the information search easier, when the apparatus 2 is configured to performs the zoom out process only with the zoom decision value surpassing the predetermined threshold.

The screen display apparatus 2 calculates the zoom decision value for performing the zooming out of the content of the screen, that is, for determining whether the user plans to view the information far apart, based on the finger departure speed from the touch pad 30. The condition of the finger departure having a certain departure speed may be comparable to the condition of throwing a paper when the screen is regarded as a piece of paper. Therefore, the interface provided in the present invention enables the user to reflect the feeling of the user to the scrolling operation of the content of the screen.

The screen display apparatus 2 in the present embodiment stops the zoom rate change process when the finger landing speed on the touch pad 30 is zero (S54:YES). The operation of tracing the touch pad 30 with the speed of zero may be assumed to be analogous to the operation that touches the content of the screen under the zoom rate change control with pressing down force applied thereto. Therefore, when the content of the screen is considered as a piece of paper, the zoom rate change may be stopped by an operation causing a similar feeling of pressing down the piece of paper. In addition, the pad 30 may be traced without lifting the finger from its surface for scrolling the content without changing the zoom rate, thereby providing an interface that suits to the feeling of the user.

Though the present embodiment utilizes the touch pad as an example of the input device, a touch panel that integrally includes a finger detection device and a display screen may also be utilized for controlling the content of the screen as described in the present embodiment. Further, an input device other than the touch panel may also be used as long as the input device is a flat coordinate input device for detecting a touch position of the finger or the pointing device.

(Third Embodiment)

A third embodiment of the present invention has a screen display apparatus 3 that is configured basically in the same manner as the apparatus 1 of the first embodiment (shown in FIG. 1), with a different feature of adsorption points 40 stored in the map data. The adsorption points 40 are the points that define a position of centering of the screen when the zoom in process is performed.

Figure 8:
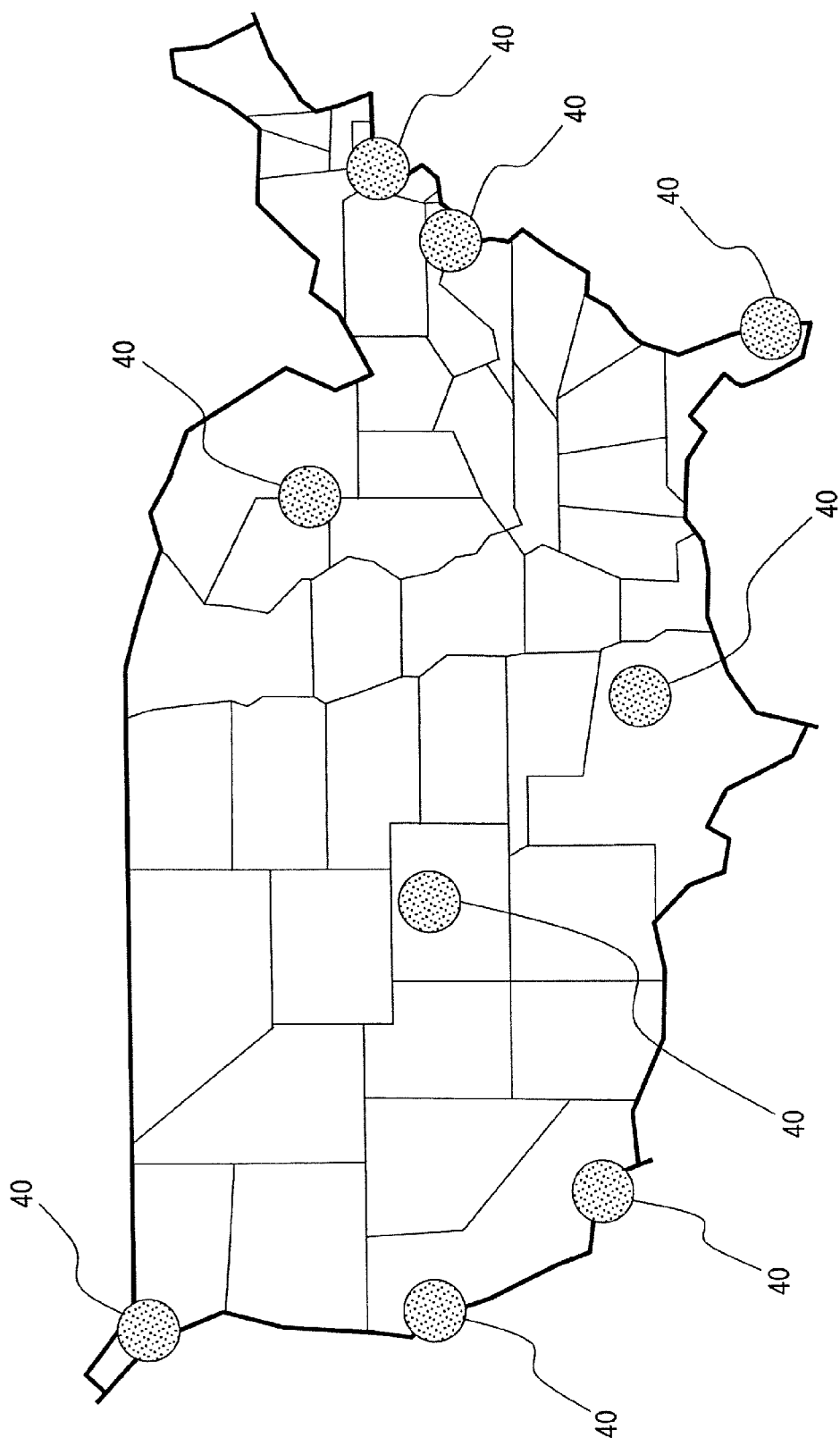
FIG. 8 shows map information stored in a map information storage in a third embodiment of the present invention.

FIG. 8 shows map information stored in a map information storage 18 in the third embodiment of the present invention. The map information storage 18 stores plural adsorption points 40 defined on a map of United States of America.

When zooming in of the screen that includes the adsorption point 40 is performed, the screen of the screen display apparatus 3 is centered around the adsorption point 40 in the third embodiment. When plural adsorption point 40 is included in the screen being zoomed out, the screen is centered around the adsorption point 40 that is nearest to the center of the screen.

Because the adsorption point 40 comes to the center of the screen to save a tactful manual centering operation of the point 40 in the zoom in process of the third embodiment, the interface of the screen display apparatus becomes very convenient for the user. For example, by setting highly referenced points such as an urban region, a station or the like as the adsorption points 40, the zoomed out screen can be easily centered around those highly referenced points.

Further, though the apparatus 3 in the third embodiment has basically the same structure as the apparatus 1 in the first embodiment, the adsorption points 40 in the present invention may also be applicable to the apparatus 2 in the second embodiment that includes the touch pad 30.

(Fourth Embodiment)

Figure 9:
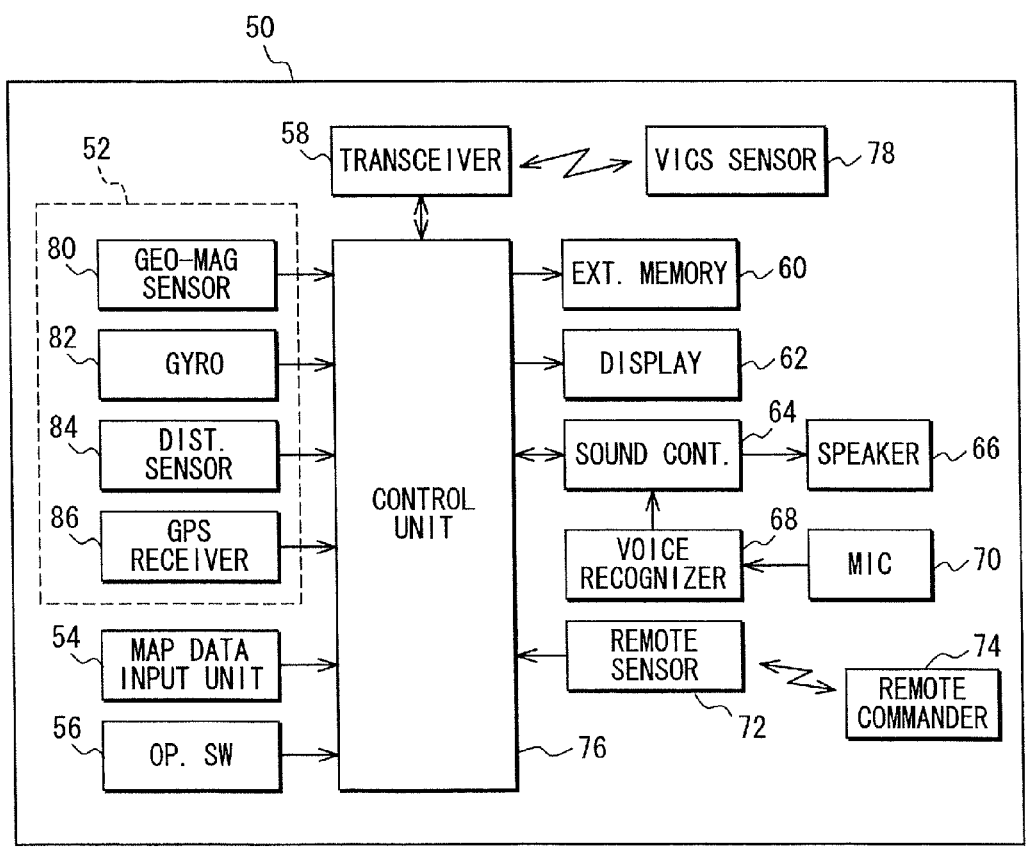
FIG. 9 shows a block diagram of a car navigation system in a fourth embodiment of the present disclosure.

FIG. 9 shows a block diagram of a car navigation system 50 with a screen display apparatus in a fourth embodiment of the present invention.

In FIG. 9, the car navigation system 50 includes a position sensing device 52, a map data input unit 54, operation switches 56, a transceiver 58, an external memory 60, a display 62, a sound controller 64, a speaker 66, a voice recognizer 68, a microphone 70, a remote controller sensor 72, a remote commander 74 and a control unit 76 which each of these devices are connected to.

The control unit 76 consists of it as a normal computer. Inside of the control unit 76, a CPU, a ROM, a RAM, an input/output (I/O) and a bus for connecting these components are included. The control unit 76 carries out predetermined processing (processing, for example, to change of a map scale, menu indication choice processing, destination setting processing, route search execution processing, route guidance start processing, present position correction processing, screen change processing, volume adjustment processing and the like) based on various information input from the position sensing device 52, the map data input unit 54; the operation switches 56, the transceiver 58, the external memory 60, the sound controller 64, the remote controller sensor 72.

The position sensing device 52 has a geomagnetism sensor 80, a gyroscope 82, a distance sensor 84 and a Global Positioning System (GPS) receiver 86. The GPS receiver 86 has a function to detect a vehicle position based on an electric wave from a satellite. Because of errors of different nature, each sensor included in the position sensing device 52 is configured to compensate the errors with each other. In addition, a rotation sensor of a steering wheel, a tire sensor of each tire or the like may be used as the position sensing device 52. Further, based on an accuracy of position sensing, the position sensing device 52 may include part of the sensors of described above.

The map data input unit 54 with a memory medium is a device to input various data including data for so-called map matching for precision improvement of position sensing stored in the memory medium, map data and mark data. Though it is common to use a CD-ROM or a DVD-ROM which can record large-volume information as the storage medium, the memory medium may be a memory card, an HDD or the like.

Operation switches 56 have the touch panel that is integrally structured with the display 62 as well as the mechanical switches such as a power button or the like. The touch panel detects a contact position of a finger on the screen and transmits the detected information to the control unit 76. The operation switch 56 transmits operation instructions of various functions (for example, a map scale change, menu indication choice, destination setting, a route search, roué guidance, a current position correction, an screen change, volume adjustment and the like) to the control unit 76 based on switch operation. In addition, though, in the present embodiment, the explanation is focused on the touch panel that detect a contact of the finger, it is apparent that use of the touch panel to detect instruction positions with an instruction device such as a stylus pen or the like may also be acceptable, and the use of the instruction device such as a stylus is included in the embodiment of the present invention.

The remote commander 74 includes plural operation switches (not shown in the figure). The remote commander 74 inputs information of switch operation into the control unit 76 through remote controller sensor 72. The control unit 76 carries out various functions depending on the switch operation. In addition, operation switches 56 and the remote commander 74 can make the control unit 76 carry out the same function by the switch operation of any kind.

When a destination is set with the remote commander 74 or operation switches 56, the control unit 76 searches an optimum route from the current vehicle position detected by position sensing device 52 to the destination, and displays the route on the display 62. As the technique to automatically set the optimum route, Dijkstra method or the like is known.

The display 62 displays a map or a destination choice screen or the like, and is capable of full color display. The display 62 may be structured by using a liquid crystal, an organic electroluminescence or the like. The display 62 displays a map based on information of the map data input unit 54, and an optimum route to the destination on the map in a superposing manner. In addition, the display 62 displays a current position mark detected by the position sensing device 52 to display a current vehicle position on the map. Further, the display 62 can also display other information such as a current time, traffic jam information additionally beside the current position, the route.

The external memory 60 is writable mass storage such as a HDD or the like. The external memory 60 stores a large quantity of data and the data which must not be erased even when the power supply is turned OFF, and the memory 60 may also be used to retain a copy of frequently used data from the map data input unit 54. In this case, the external memory 60 may be a comparatively small memory that can be removable from a system.

The transceiver 58 has a function to receive information from outside (for example, infrastructure such as VICS systems in Japan) such as traffic information, weather information, facility information, advertising information and the like, and has a function to send information such as vehicle information, user information and the like to the outside. The transceiver 58 transmits the information received from the outside to the control unit 76, and the information is processed by the control unit 76. In addition, the transceiver 58 can output the information that is processed by the control unit 76 if necessary from transceiver 58 itself.

The speaker 66 outputs audible signals such as a guidance voice, a screen operation instruction, a voice recognition result and the like based on a voice output signal input from the sound controller 64.

The microphone 70 inputs voice of the user as an electric signal to the voice recognizer 68.

The voice recognizer 68 compares an input of the voice of the user from the microphone 70 and vocabulary data (i.e., comparison patterns) in a recognition dictionary stored therein, and inputs a most matching data to the sound controller 64.

The sound controller 64 controls the voice recognizer 68, and controls a talkback output control (i.e., an audio output) through the speaker 66. In addition, the sound controller 64 controls to input a recognition result of the voice recognizer 68 into the control unit 76. The control unit 76 carries out a predetermined processing (processing, for example, to change of a map scale, menu indication choice processing, destination setting processing, route search execution processing, route guidance start processing, present position correction processing, screen change processing, volume adjustment processing and the like) in response for utterance of the user based on the information from the voice recognizer 68. In addition, route guidance sound information processed by the control unit 76 and the like is provided through the sound controller 64 from speaker 66.

Figure 10:
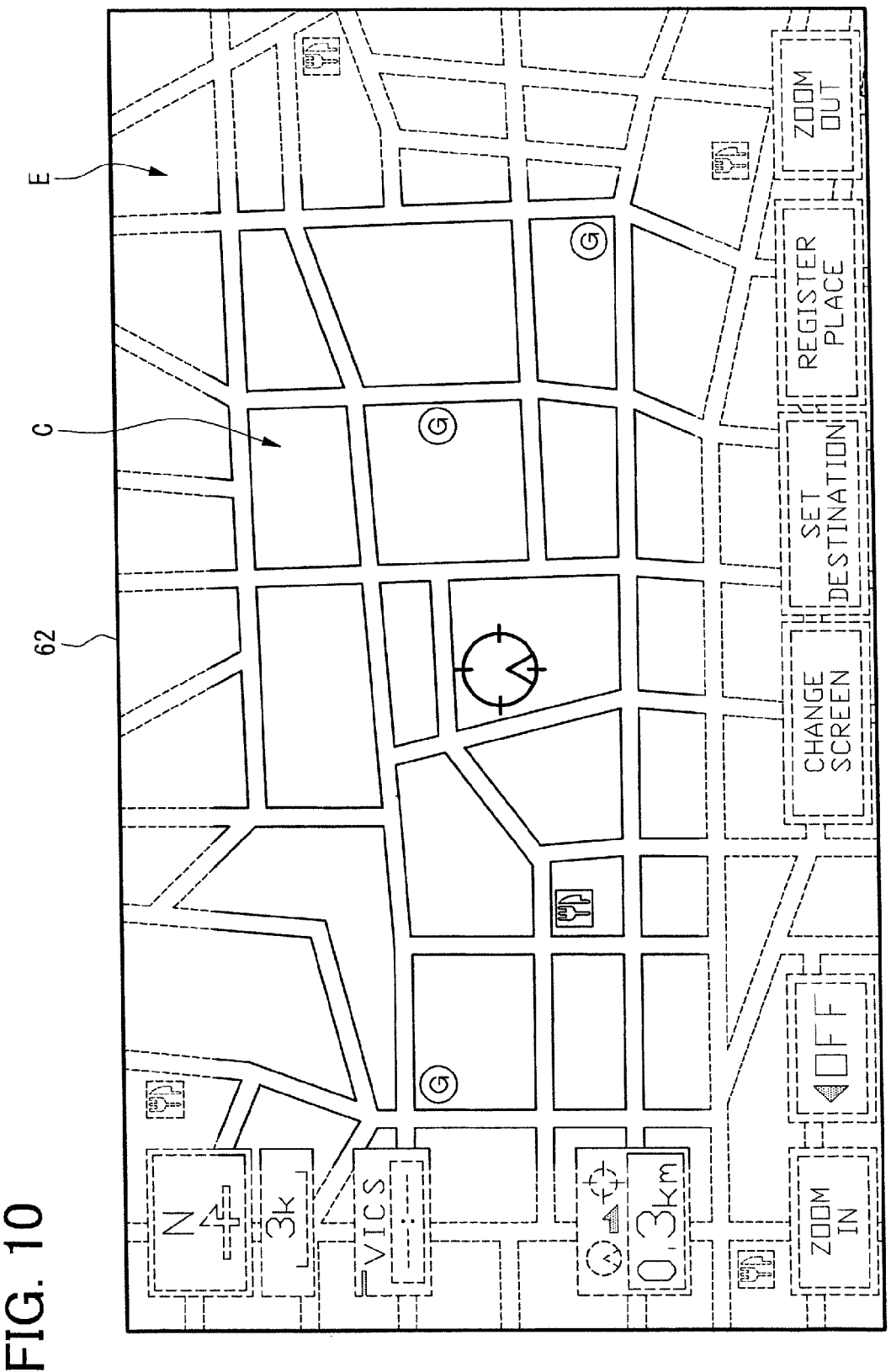
FIG. 10 shows an illustration of the screen display apparatus that is equipped with a touch panel.

Then, the scroll process of the screen displayed on the display 62 is described. FIG. 10 shows an illustration of an example of the display 62 with the touch panel that shows an image. As shown in FIG. 10, the screen shown in the display 62 always displays the image around an area C (a 'center area' hereinafter) that includes a center portion of the display 62, and also displays an area E (a 'peripheral area' hereinafter) that includes a peripheral portion of the display 62 with an exclusion of the center area in a half transparent manner. In this manner, the' user can easily distinguish the center area C from the peripheral area E.

In the present embodiment, the control unit 76 performs scroll with zoom when the peripheral area E with semi-transparency is touched, and the control unit 76 performs scroll without zoom when the center area C is touched. In the following description, the scroll with zoom is designated as "the first mode" and the scroll without zoom is designated as "the second mode."

Figure 11:
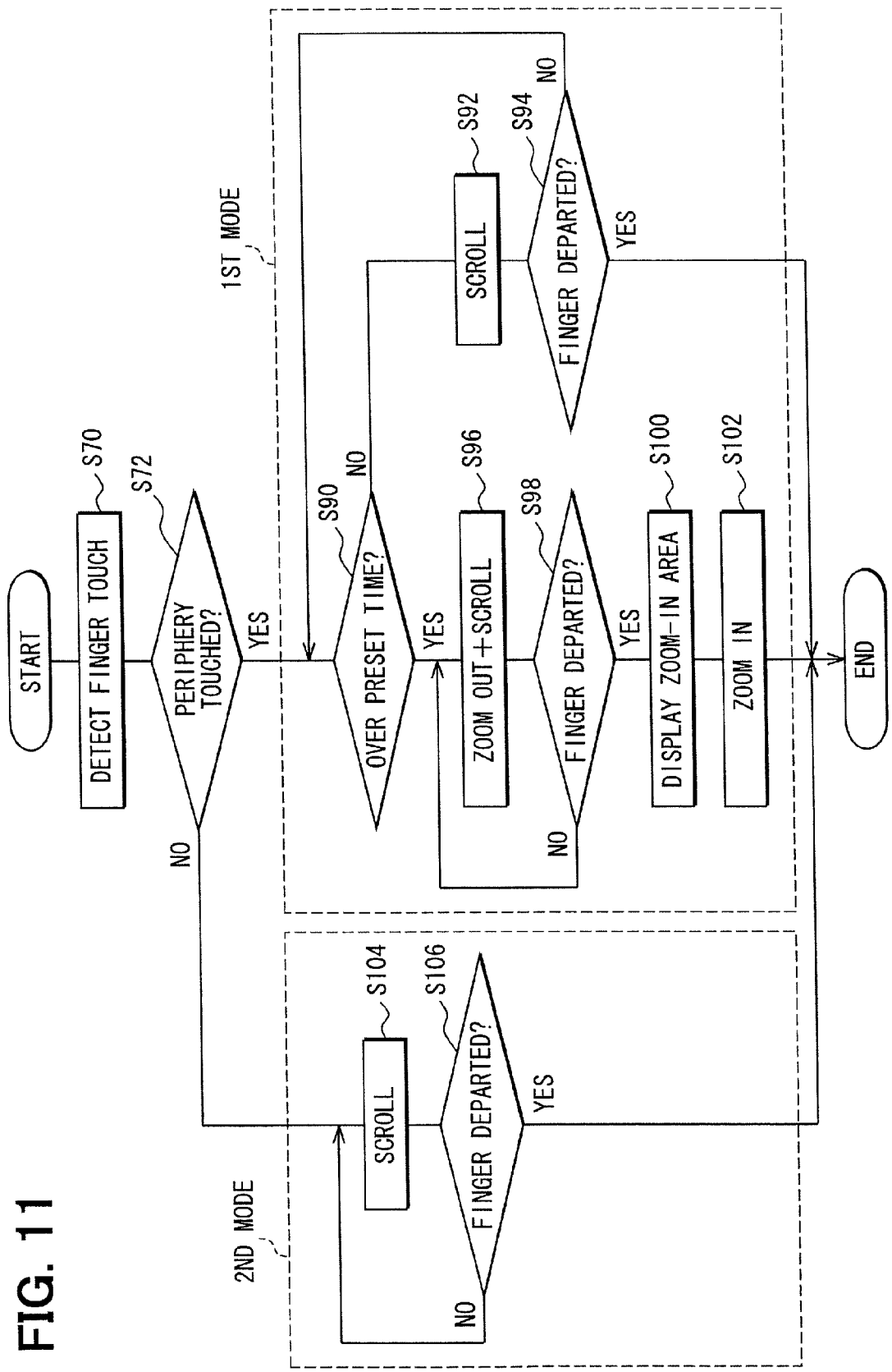
FIG. 11 shows a flowchart of a scroll control in a fourth embodiment of the present invention.

FIG. 11 shows a flowchart of a scroll control in a fourth embodiment of the present disclosure. When the touch panel detects the contact of the finger (S70), the control unit 76 determines whether the position of the contact is in the peripheral area E (S72). When the position of the contact is in the peripheral area E (S72:YES), the control unit 76 controls the screen in the first mode.

In the first mode, the control unit 76 determines whether the time of touching on the touch panel is longer than a preset time (S90). When time of touching does not surpass the preset time (S90:NO), the display unit 62 performs the scroll process according to the touch position. For example, the scroll process is conducted in a direction that is determined by a vector form the center of the screen to the touch position. In this case, the scroll speed may be determined depending on the distance from the center of the screen to the touch position. The control unit 76 determines whether the finger has departed from the touch panel while performing the scroll process (S94). When the finger is determined to depart (S94: YES), the screen control is concluded. In other words, the control unit 76 stops the scroll process and displays a map at a stopped position.

When the finger is determined not to depart (S94:NO), the process returns to step S90 and determines whether the preset time of touching has passed (S90). With this control, the scroll without zoom is performed till the preset touching time passes, and, a process for stopping the screen control is performed at the time of the finger departure (S94:YES).

When the touching time has passed the preset time (S90: YES), the control unit 76 performs the scroll process according to the touch position accompanied by the zoom out process (S96). In this case, the scroll speed may be a constant speed without regard to the zoom rate, or may be decreased in proportion to the decrease of the zoom rate. When the zoom rate becomes smaller, a wider area is displayed in the screen. By making the scroll speed slower, the position of the scroll can be fine-tuned in the map that displays the wider area.

The control unit 76 determines whether the finger has departed from the touch panel while performing the scroll process and the zoom out process (S98). When the finger has not determined to depart (S98:NO), the zoom out process and the scroll process are continued. In this case, the zoom out process stops when it reaches the minimum zoom rate of a preset value, and only the scroll process is continued at the preset minimum zoom rate afterwards.

When the finger has determined to depart (S98:YES), the control unit 76 calculates the area that is displayed in the screen at the time of the zoom in to the maximum zoom rate, and displays the calculated area on the image at the current zoom rate (S100).

Figure 12:
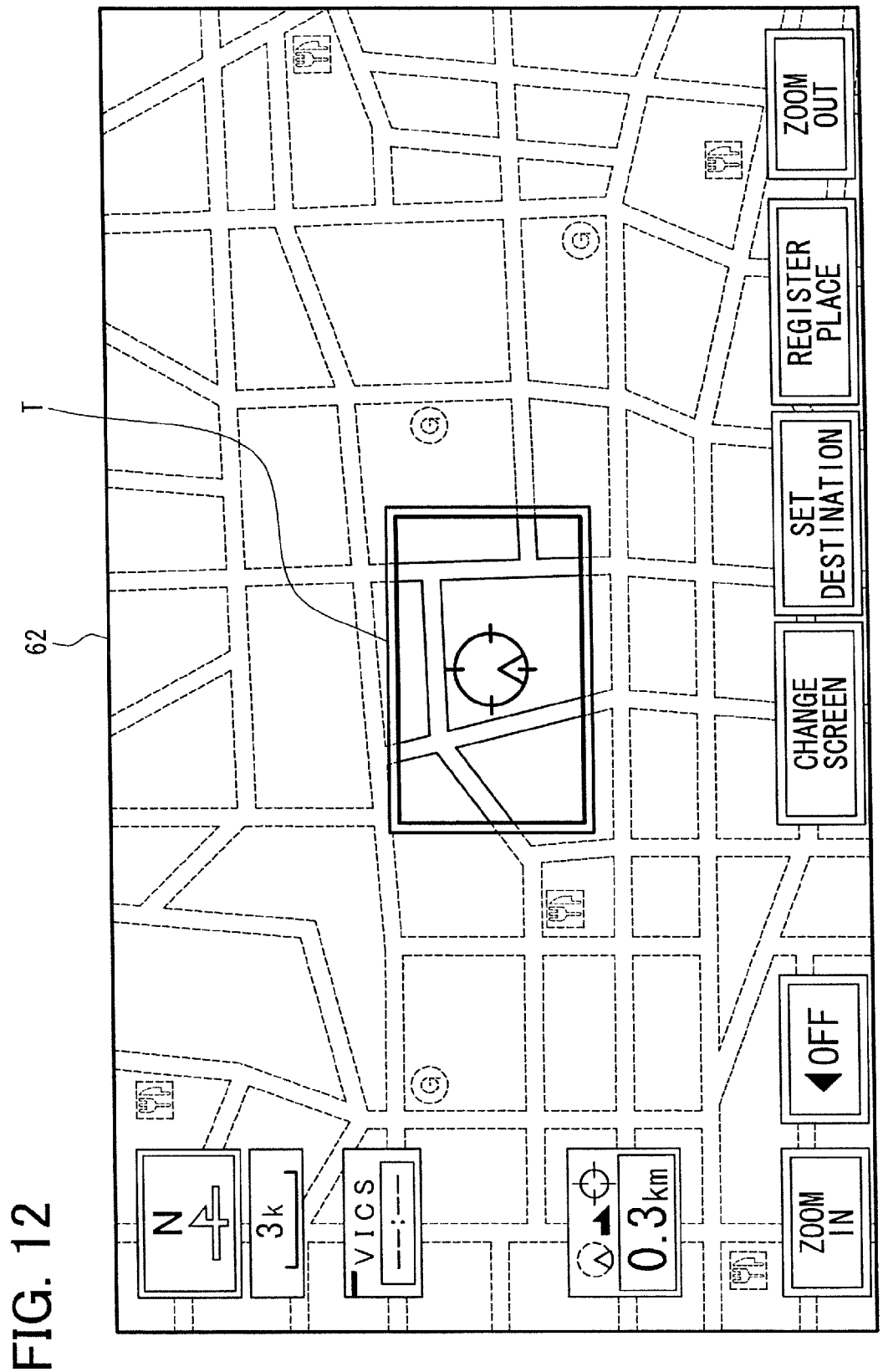
FIG. 12 shows an illustration of a zoomed-in area shown on a content of a screen at current zoom rate.

FIG. 12 shows an illustration of a zoomed-in area shown on the content of the screen at the current zoom rate. As shown in FIG. 12, the position of the zoomed-in area in the wide area map can be grasped as the zoomed-in area T on the map of the current zoom rate. In this case, though the zoomed-in area T is described in the present embodiment, the zoom in process may simply be performed without displaying the area T.

Then, the control unit 76 performs the zoom in process (S102) to return to the maximum zoom rate. In this case, in step S102 in FIG. 11, the zoom in process only is performed after the finger departure. However, the scroll with the zoom in process may be performed according to the finger position at the time of the finger departure. In this case, the calculation of the zoomed-in area displayed in step S100 takes into the account the gap of the display area caused by the scroll. The above-described process is the screen control in the first mode.

In the determination that the touched position is in the peripheral area E (S72), the control unit 76 performs the scroll process according to the touched position (S104) when the touched position is not determined to be the peripheral area E (S72:NO). The control unit 76 determines whether the finger has departed from the touch panel (S106) while performing the scroll process. When the finger has not determined to depart (S106:NO), the scroll process is continued, and the finger has determined to depart (S106:YES), the screen control is concluded. That is, the control unit 76 stops the scroll process and displays the map at the stopped position.

The above is the description of the navigation system 50 that is equipped with the screen display apparatus in the fourth embodiment of the present disclosure.

The screen display apparatus in the present embodiment performs the scroll without zoom when the center area C of the touch panel is touched, and performs the scroll with zoom when the peripheral area E of the touch panel is touched. When the user touches the peripheral area E, it indicates that the user is considered to have an intention to see the adjacent area next to the display area in the screen, or the area farther than the adjacent area. In the present embodiment, by the zoom out process at the touch of the peripheral area E, the intention of the user is reflected to a fast scroll in the information space.

Further, because the screen display apparatus in the present embodiment performs the zoom out process after the preset time from the touch of the peripheral area E, the zoom out process is not performed when the peripheral area E is mistakenly touched. By performing the scroll without zoom before the preset time passes, the intention of the user to touch the peripheral area E is undoubtedly assumed to appropriately perform the zoom out process. In addition, the user needs not be surprised by a start of the zoom out process.

Because the display 62 displays the peripheral area E with semi-transparency and displays the center area C as normal transparency in the screen in the present embodiment, the user can grasp where the peripheral area E is in the screen. In this case, the peripheral area E may be separated from the center area C by a line instead of being displayed with semi-transparency for the purpose of easy recognition from the center area C in the present embodiment. In addition, the peripheral area E may not be distinguished from the center area C in the screen.

(Fifth Embodiment)

In the navigation system in a fifth embodiment is described in the following. The navigation system in the present embodiment is basically the same as the one in the fourth embodiment (refer to FIG. 10), with the difference of a mode switch method that switches the operation mode of the system between the first mode and the second mode.

Figure 13:
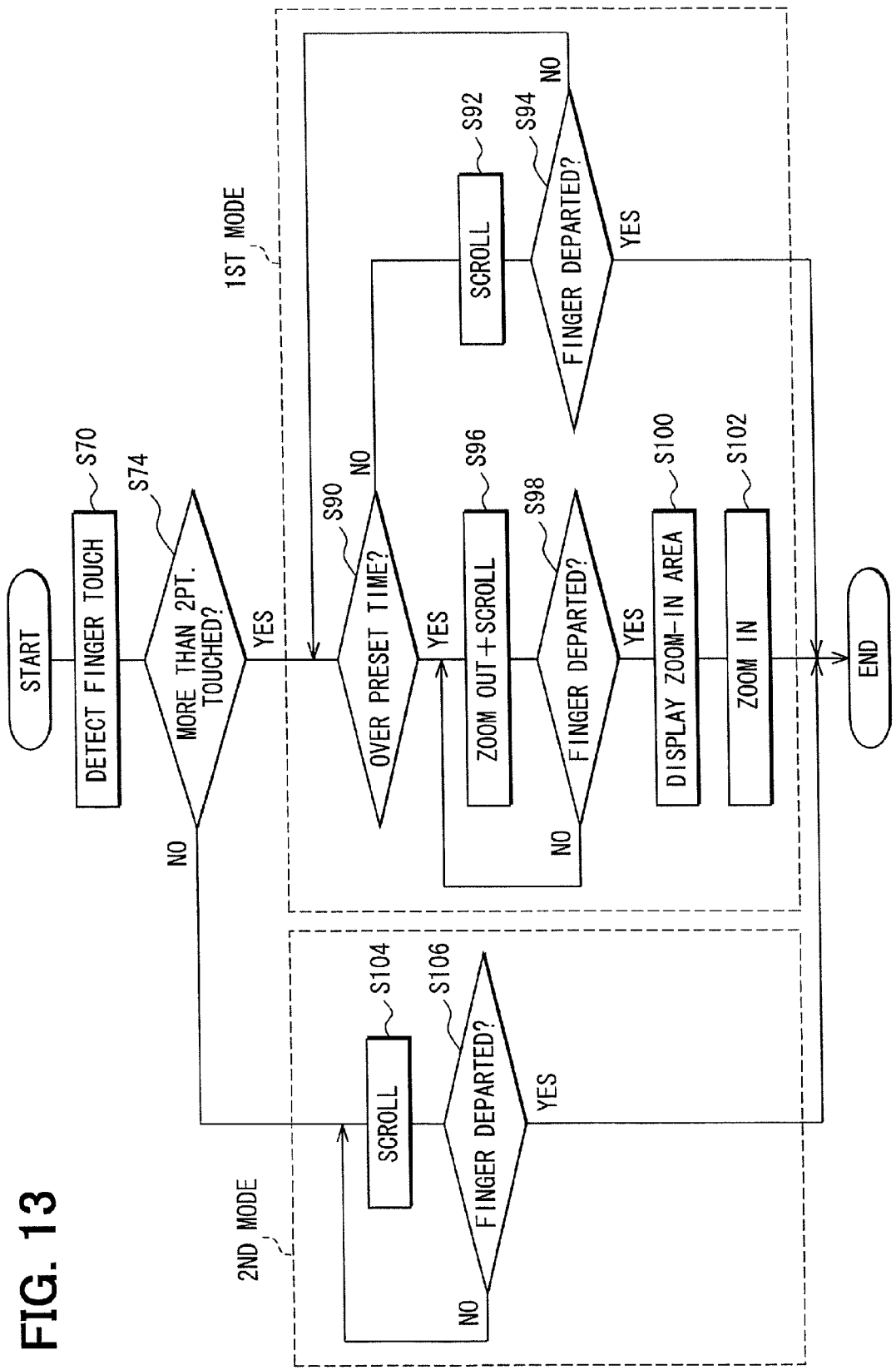
FIG. 13 shows a flowchart of a scroll control in a fifth embodiment of the present invention.

FIG. 13 is a FIG. 13 shows a flowchart of a scroll control in the fifth embodiment of the present invention. The touch panel determines whether two or more places are touched at the same time on the screen (S74), when the touch on the screen is detected (S70). When more than two places are determined to be touched at the same time (S74:YES), the control department 76 performs a screen control (scroll with zoom) by the first mode, and when more than two places are not determined to be touched at the same time (S74:NO), the control department 76 performs a screen control (scroll without zoom) by the second mode. The first mode and the second mode of the screen control are the same as the screen control of the fourth embodiment.

The screen display apparatus in the fifth embodiment can switch the scroll of the screen with/without zooming by the number of touching fingers on the touch panel. Therefore, the user can switch the operation mode only by operating the touch panel.

The present embodiment may be modified to a form that, when one finger is detected to depart from the touch panel in the zooming out process of the first mode, the zooming out process is stopped to have the screen scrolled at the constant zoom rate at the time of the stop of the zooming out.

(Sixth Embodiment)

The navigation system equipped with the screen display apparatus in a sixth embodiment of the present disclosure is described. The navigation system in the sixth embodiment is configured basically in the same manner as the navigation system 50 in the fourth embodiment (refer to FIG. 10), and the touch panel in the sixth embodiment has a pressure sensing function when it detects the contact of the finger. Further, the method of switching between the first and the second mode in the sixth embodiment is configured differently from the fourth embodiment.

Figure 14:
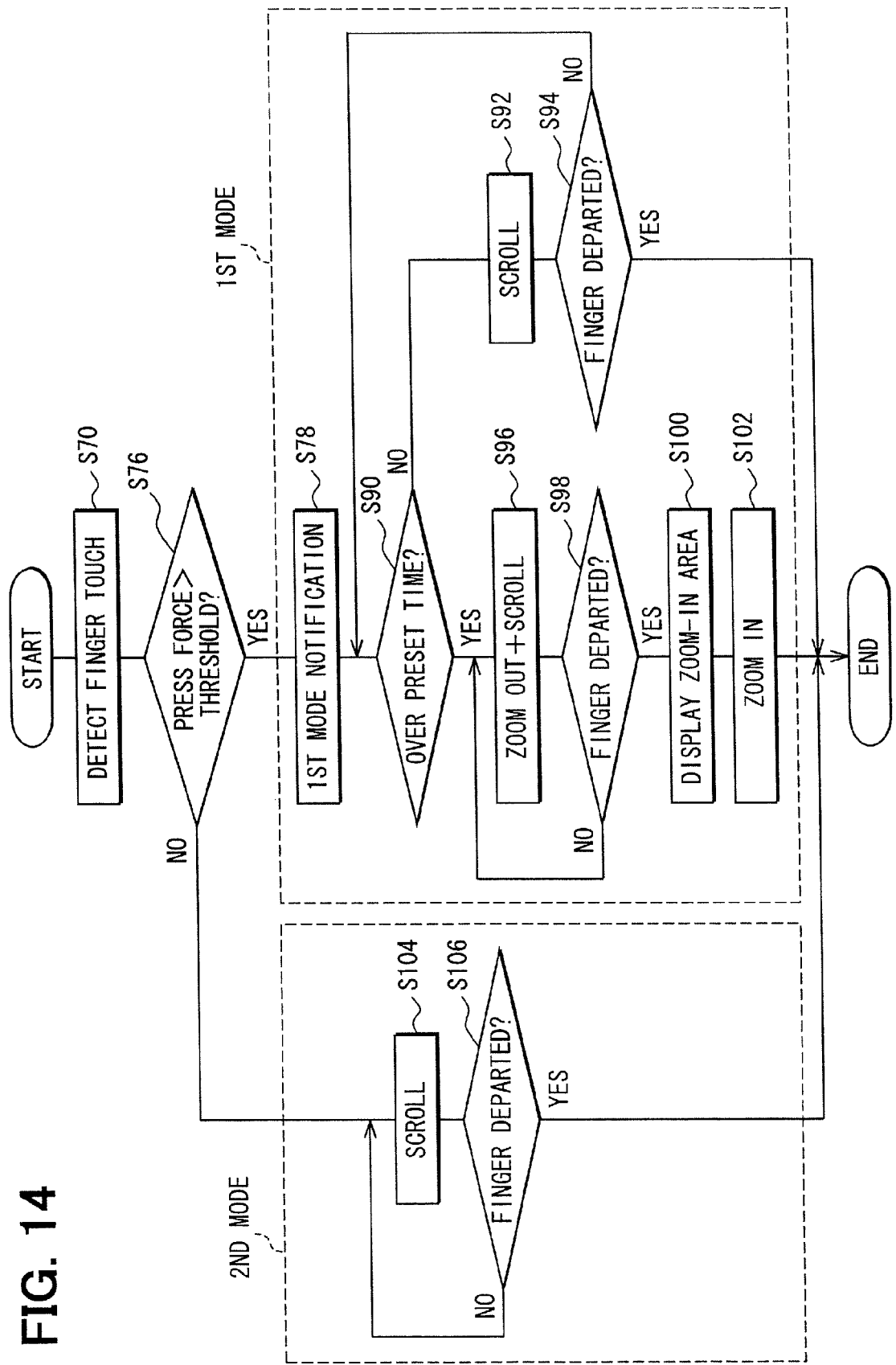
FIG. 14 shows a flowchart of a scroll control in a sixth embodiment of the present invention.

FIG. 14 shows a flowchart of a scroll method in the sixth embodiment. The touch panel determines whether a press force of a touch is bigger than the predetermined threshold (S76) when it detects a touch of a screen (S70). When it is determined that the press force is equal to or smaller than the predetermined threshold (S76:NO), the control unit 76 controls the screen in the second mode. When it is determined that the press force is greater than the predetermined threshold (S76:YES), the control unit 76 controls the screen in the first mode. In the present embodiment, being in the first mode is announced to the user before performing the screen control in the first mode (S78). For example, a voice message such as "scroll with zooming" may be output, or an electrical sound may bleep. In this manner, the user is notified that the scroll is performed in the preferred mode. In the present embodiment, the description explains an example that the operation in the first mode is notified when the first mode is set. However, the second mode may be notified when the operation is set to the second mode, or both of the first and second mode may be notified when the operation is set to either of the two modes. The screen control in the first mode and in the second mode thereafter is performed in the same manner as the fourth embodiment.

The screen display apparatus in the sixth embodiment can switch whether the scroll is performed with or without zooming depending on the press force of the touch on the touch panel. Therefore, the user can switch the operation modes only by operating the touch panel.

Further, in the present embodiment, the description explains an example that the screen control concludes itself for terminating each of the operation mode when the touch of the finger is detected (S94/S98/S106:YES). However, the first and the second mode may be switched with each other when the press force is varied with the finger staying in contact with the touch panel.

(Seventh Embodiment)

The navigation system equipped with the screen display apparatus in a seventh embodiment of the present disclosure is described. The navigation system in the seventh embodiment is configured basically in the same manner as the navigation system 50 in the fourth embodiment (refer to FIG. 10). However, the method of switching between the first and the second modes is configured differently.

Figure 15:
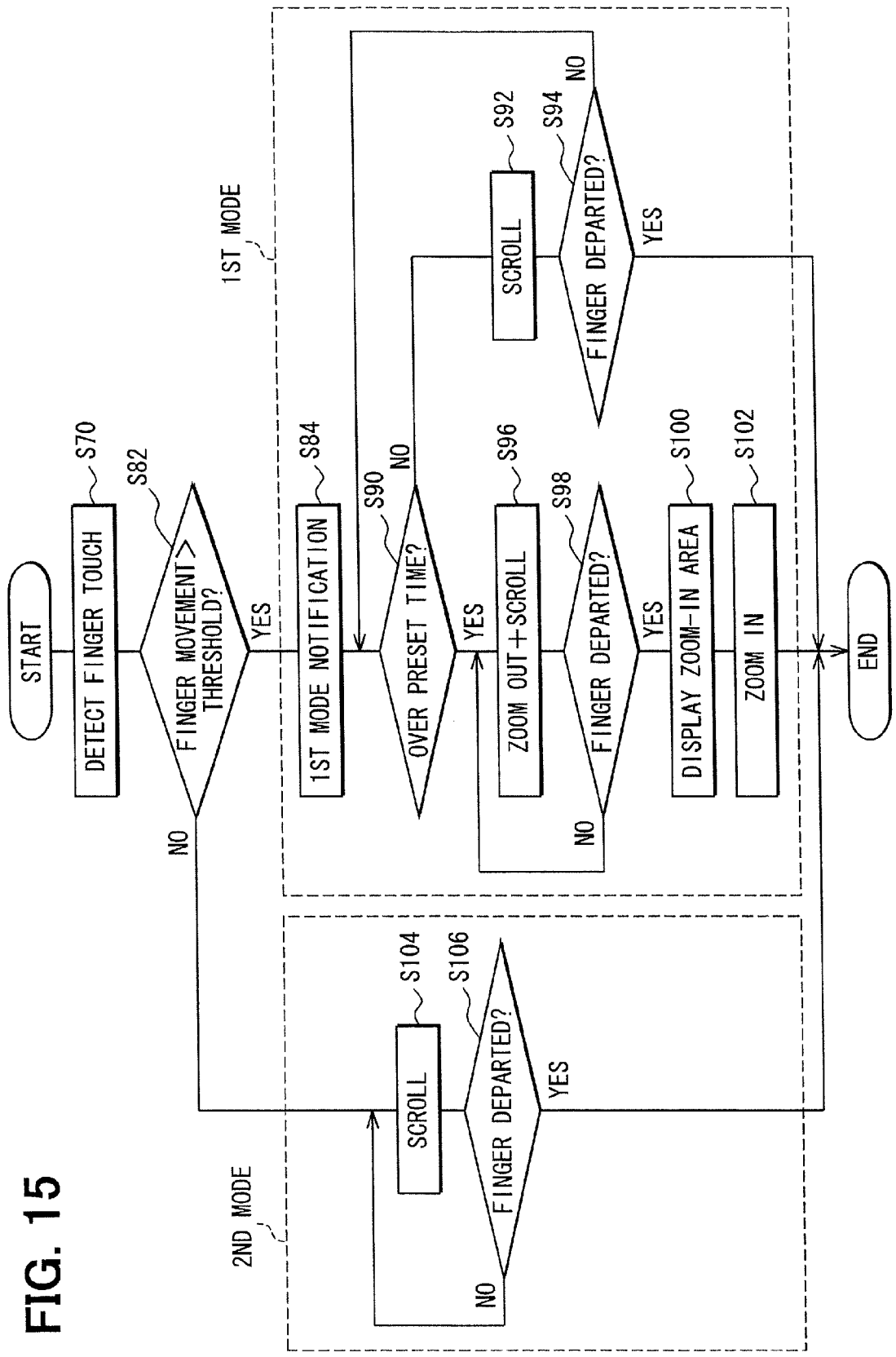
FIG. 15 shows a flowchart of a scroll control in a seventh embodiment of the present invention.

FIG. 15 shows a flowchart of a scroll method in the seventh embodiment. When the touch of the screen is detected (S70), the touch panel traces a movement of the touching finger, and determines whether the length of the finger movement is longer than a predetermined threshold (S82). When the length of the finger movement is longer than the threshold (S82: YES), the control unit 76 performs the screen control in the first mode. When the screen control is in the first mode, being in the first mode is notified for the user (S84) in the same manner as the sixth embodiment. When the length of the finger movement is smaller than the predetermined threshold (S82:NO), the control unit 76 performs the screen control in the second mode. The screen control in the first and the second mode thereafter is performed in the same manner as the fourth embodiment.

The screen display apparatus in the seventh embodiment can switch whether the scroll is performed with or without zooming with the movement of the finger, thereby enabling the user to switch the operation mode only by operating the touch panel.

(Eighth Embodiment)

The navigation system equipped with the screen display apparatus in the eighth embodiment is described in the following. The navigation system in the eighth embodiment is configured basically in the same manner as the navigation system 50 in the fourth embodiment (refer to FIG. 10), with an addition of a mode switching switch in the operation switches 56 for switching the operation mode. The mode switching switch may be, for example, disposed on a steering wheel.

Figure 16:
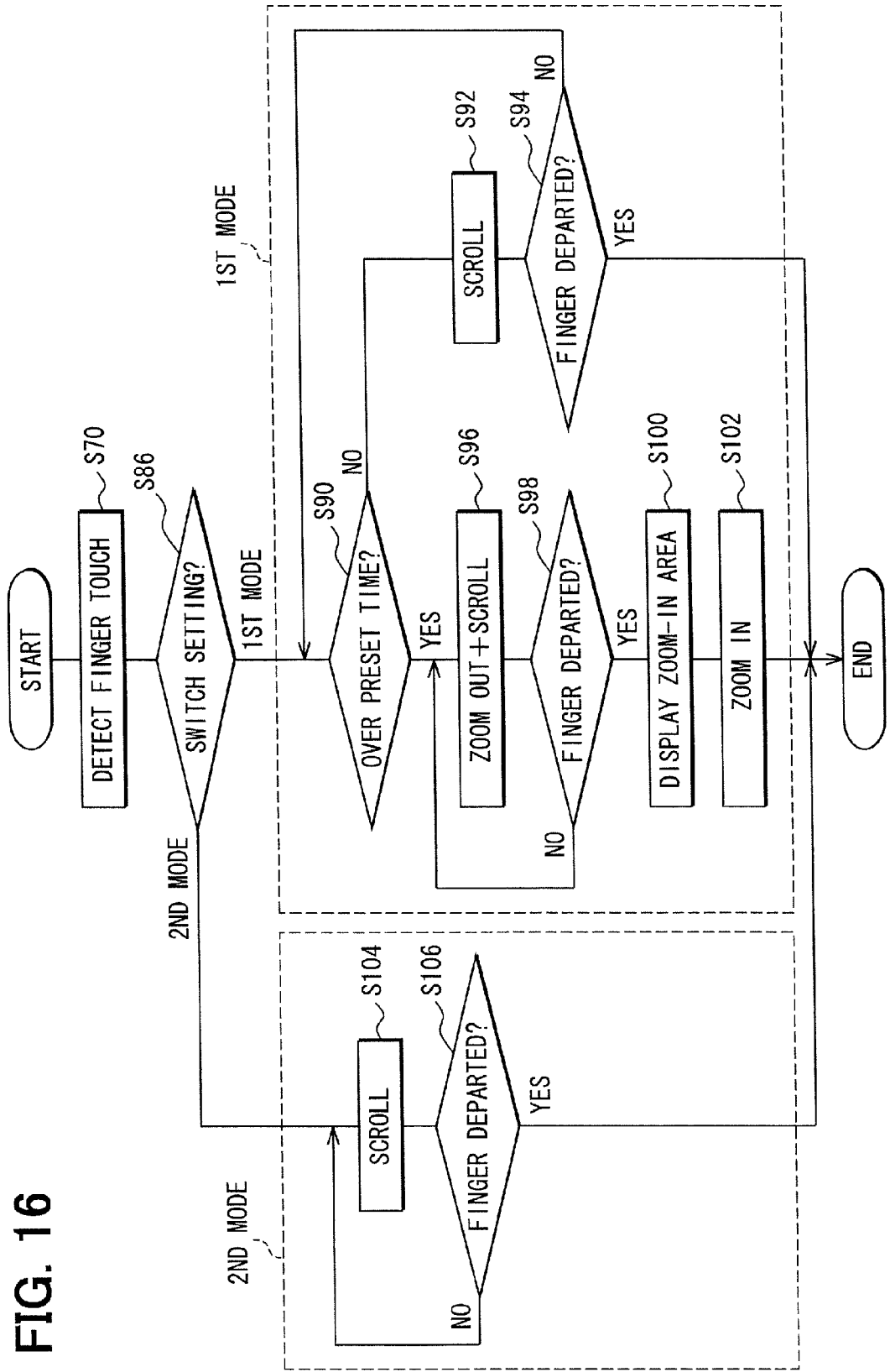
FIG. 16 shows a flowchart of a scroll control in a eighth embodiment of the present invention.

FIG. 16 shows a flowchart of a scroll control in the eighth embodiment. The touch panel determines the mode switching switch is set to which of the first and the second mode (S86) when the touch of the screen is detected (S70). The control unit 76 performs the screen control in either of the first or the second mode according to the setting of the mode switching switch. The screen control in the first and the second mode is performed in the same manner as the fourth embodiment.

As the screen display apparatus in the eighth embodiment can switch whether the scroll with zooming is performed by using the mode switching switch, thereby allowing the user to easily and securely perform the mode change.

(Ninth Embodiment)

Figure 17:
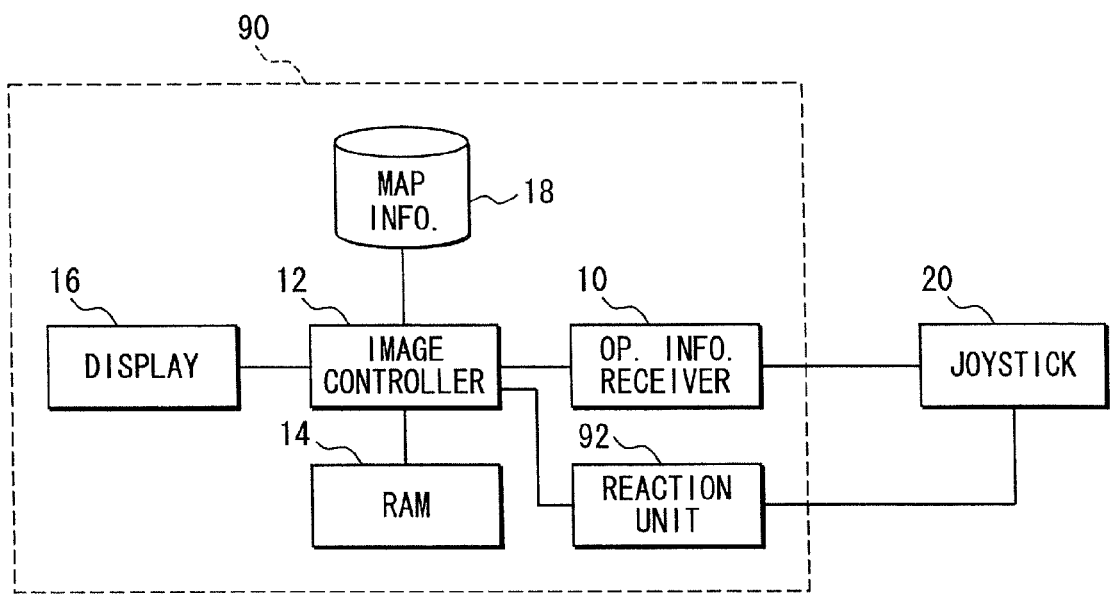
FIG. 17 shows a block diagram of the screen display apparatus in a ninth embodiment of the present invention.

FIG. 17 shows a block diagram of a screen display apparatus 90 in a ninth embodiment of the present disclosure. The screen display apparatus 90 in the ninth embodiment is configured basically in the same manner as the screen display apparatus 1 in the first embodiment, with an addition of a reaction unit 92 that applies a reaction force to the movement of the joystick 20.

The screen display apparatus 90 in the ninth embodiment performs the scroll without zooming in the same manner as the apparatus 1 in the first embodiment when a inclination angle of the joystick 20 is equal to or smaller than the first threshold D1, and, performs the scroll with zooming when the inclination angle is greater than the first threshold D1. Further, the apparatus 90 performs the zoom in process when the inclination angle of the joystick 20 became smaller than the second threshold D2 during the scroll with zooming.

In the screen display apparatus 90 of the ninth embodiment, the reaction unit 92 applies the reaction force to the joystick 20 in a direction that suppresses the inclination angle to be equal to or smaller than the first threshold D1 when the joystick 20 is forced to be inclined to a degree that is greater than the first threshold D1. Further, the reaction unit 92 applies the reaction force to the joystick 20 in a direction that increases the inclination angle to be equal to or greater than the second threshold D2 when the inclination angle of the joystick 20 is forced to be smaller than the second threshold D2.

When the inclination angle of the joystick 20 is forced to exceed the first threshold D1 or the second threshold D2, the screen display apparatus 90 in the ninth embodiment applies the reaction force to restrict the original movement for the purpose of notification to the user. In this manner, the user recognizes in a tactile manner that the zoom out process or the zoom in process will be started when the user moves the joystick 20 against the reaction force.

Although the present invention has been fully described in connection with the preferred embodiment thereof with reference to the accompanying drawings, it is to be noted that various changes and modifications will become apparent to those skilled in the art.

The screen display apparatus 1, 2 described above may have a zoom stop button for stopping the zoom process. When the zoom rate is changed to a certain rate, the zoom rate is fixed by pressing the zoom stop button to have the scroll performed without zooming. In this manner, the zoom rate will not be automatically changed by any kind of operations, thereby providing a confidence for the user that the scroll operation by the user will be performed without zooming.

The screen display apparatus 1, 2 described above may not necessarily perform the zooming operation at a constant zooming speed with the screen controller 12, though the example described above adopts the constant zoom speed. For example, the screen display apparatus 1 in the first embodiment may determine the zooming speed according to the inclination angle of the joystick 20. The apparatus 2 in the second embodiment may determine the zooming speed in proportion to the zoom decision value that is derived from the repeated input. However, in either case, the zooming speed is controlled not to have a steep speed change. In this manner, i.e., when the zooming speed is controlled according to the input value from the input device such as the joystick 20, the touch pad 30 or the like, the zooming speed control according to the intention of the user is achieved.

The screen display apparatus 2 in the second embodiment describes an example that the zoom rate changing process is stopped when the speed of the finger that touches the touch pad 30 is equal to zero. However, two threshold values may be set as those in the first embodiment, and the zoom decision value surpassing the first threshold value may cause the zoom out process and the zoom decision value equal to or smaller than the second threshold value may cause the zoom in process. In this manner, the zoom rate changing process is stopped when the zoom decision value stays equal to or under the first threshold and over the second threshold.

The screen display apparatus 2 in the second embodiment may control the zoom rate changing process based on the press force applied on the touch pad 30 by receiving the pressure signal that represents the press force. For example, a trace with a strong press force may cause the zooming out or the like.

The screen display apparatus 1 described above may have an angle changing function for changing the angle of the map information displayed in the screen, and may perform the zoom out and the zoom in process with the angle of the map being in a changed condition. For example, when the screen is in an angle that views the map in a looking down manner from a diagonal upper direction, the inclination angle of the joystick 20 over the predetermined threshold may cause the angle of the screen to be smoothly changed to the view of a straight looking-down from above while the view is being zoomed out.

Though the embodiment described above describes an example that uses the joystick, the touch pad and the touch panel as the input devices, the present invention may be applicable to the input devices that is not described in the embodiments. That is, for example, the screen display apparatus of the present disclosure may be controlled based on the operation information transmitted from a pointing device such as a mouse, a jog-dial, a trackball, a rotary switch or the like. The jog-dial is an input device that instructs operations by a rotation of the dial and a press of the dial. When the jog-dial is used, the screen may be scrolled according to the rotation of the jog-dial, and the press of the dial may be associated to the switching operation that switches between the scroll with zooming and the scroll without zooming.

The touch panel described in the fourth to the eighth embodiments may be replaced with the touch pad. Further, tee touch panel may be replaced with other input devices as long as input device is the plane coordinate input device that senses the touch position of the finger or the pointing device.

Though the example in the ninth embodiment described above applies the reaction force to the joystick 20 when the inclination angle of the joystick 20 is the threshold of the zoom rate change, the reaction force application condition is not limited to the zoom rate change.

Though the example in the ninth embodiment described above applies the reaction force to the user through the joystick 20, the application of the reaction force is not limited through the joystick 20. For example, the trackball, the jog-dial, and the rotary input device such as the rotary switch or the like may have the reaction force that restricts the rotation when the zoom rate is changed.

For example, the scroll through the boundaries of the municipalities may have the reaction force. In this manner, the user can easily recognizes that the contents of the screen has scrolled through the boundary of the municipality. Further, when the route to the destination is set, the screen display apparatus may apply the reaction force to an input of the operation information that scrolls the route out of the screen. In this manner, the user is guided by the reaction force of the joystick 20, thereby being enabled to perform the scroll of the screen along the route toward the destination. Furthermore, when the route to the destination has not been set, the screen display apparatus may apply the reaction force to the operation information that scrolls the screen toward the sea. This is based on the assumption that the navigation system is not usually scrolled toward the sea. That is, when the user scrolls the screen toward the sea, the user is assumed to be performing a wrong operation. Therefore, by applying the reaction force to the joystick 20, the user is notified that he/she is performing the wrong operation.

Though the scroll with zooming is described as the scroll of the screen according to the operation of the input device in the above embodiments, the scroll with zooming may be applied for, for example, displaying the searched map around the destination. That is, when the destination is searched by name, by telephone number or the like, the map may be scrolled to the searched destination with the zooming operation combined therewith instead of switching the current position of the map to the destination. In this case, the route from the current position to the destination may be guided by the scroll with zooming along the searched route. In this manner, the user can have an overview of the route.

The present invention is described as the screen display apparatus and its operation in the above embodiments. However, a program for controlling a computer to perform the process by the above-described screen display apparatus is within the scope of the present disclosure.

According to the present disclosure, the screen display apparatus provides excellent advantages such as an easy zoom rate change operation to a certain zoom rate as well as the scroll of the screen with a constant zoom rate at the time of stopping the zoom process. In addition, the present disclosure is applicable to various apparatuses such as a navigation apparatus, a portable terminal, a personal computer, an amusement game machine, a medical image viewing apparatus, and household appliances including a video recorder, a television and the like.

Such changes and modifications are to be understood as being within the scope of the present invention as defined by the appended claims.

What is claimed is:

1. A screen display apparatus comprising:
   an operation information reception unit that receives from an input device operation information regarding an inclination direction and an inclination angle of the input device; and
   a screen controller that scrolls a screen content in the inclination direction of the input device based on the operation information received by the operation information reception unit,
   wherein the screen controller performs a zoom-out process for zooming out by changing a zoom rate while scrolling the screen content when the inclination angle of the input device is greater than a first threshold, and
   the screen controller stops the changing of the zoom rate and scrolls the screen content at a stopped zoom rate when the inclination angle of the input device is detected to be smaller than the first threshold and greater than a second threshold.

2. The screen display apparatus of claim 1, wherein
   when the screen content is scrolled at the stopped zoom rate, the screen controller performs a zoom-in process while scrolling the screen content upon detecting that the inclination angle of the input device is smaller than the second threshold.

3. A method of displaying a screen comprising:
receiving operation information regarding an inclination direction and an inclination angle of an input device from the input device; and
scrolling a screen content in the inclination direction of the input device based on the received operation information,
performing a zoom-out process for zooming out by changing a zoom rate while scrolling the screen content when the inclination angle of the input device is greater than a first threshold, and
stopping the changing of the zoom rate and scrolling the screen content at a stopped zoom rate when the inclination angle of the input device is detected to be smaller than the first threshold and greater than a second threshold.

4. The method of displaying a screen as in claim 3, wherein when the screen content is scrolled at the stopped zoom rate, performing a zoom-in process while scrolling the screen content upon detecting that the inclination angle of the input device is smaller than the second threshold.

5. A screen display apparatus comprising:
an operation information reception unit that receives from an input device operation information regarding an inclination direction and an inclination angle of the input device; and
a screen controller that scrolls a screen content in the inclination direction of the input device based on the operation information received by the operation information reception unit,
wherein the screen controller performs a zoom-out process for zooming out by changing a zoom rate while scrolling the screen content when the inclination angle of the input device is greater than a first threshold,
the screen controller performs a zoom-in process for zooming in by changing the zoom rate while scrolling the screen content when the inclination angle of the input device is smaller than a second threshold, and
the screen controller stops the changing of the zoom rate and scrolls the screen content at a stopped zoom rate when the inclination angle of the input device is detected to be smaller than the first threshold and greater than the second threshold.

6. A method of displaying a screen comprising:
receiving operation information regarding an inclination direction and an inclination angle of an input device from the input device; and
scrolling a screen content in the inclination direction of the input device based on the received operation information,
performing a zoom-out process for zooming out by changing a zoom rate while scrolling the screen content when the inclination angle of the input device is greater than a first threshold,
zooming in by changing the zoom rate while scrolling the screen content when the inclination angle of the input device is smaller than a second threshold, and
stopping the changing of the zoom rate and scrolling the screen content at a stopped zoom rate when the inclination angle of the input device is detected to be smaller than the first threshold and greater than the second threshold.

* * * * *